(12) United States Patent
Sasaki et al.

(10) Patent No.: US 8,295,008 B1
(45) Date of Patent: Oct. 23, 2012

(54) MAGNETIC HEAD FOR PERPENDICULAR MAGNETIC RECORDING HAVING A MAIN POLE AND A SHIELD

(75) Inventors: Yoshitaka Sasaki, Santa Clara, CA (US); Kazuki Sato, Milpitas, CA (US); Hiroyuki Ito, Milpitas, CA (US); Kazumasa Yasuda, Sunnyvale, CA (US); Atsushi Iijima, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/189,151

(22) Filed: Jul. 22, 2011

(51) Int. Cl.
*G11B 5/127* (2006.01)

(52) U.S. Cl. ................. 360/125.02; 360/125.3

(58) Field of Classification Search ............ 360/119.02, 360/119.03, 119.04, 125.3, 125.71, 125.72, 360/125.02, 125.03

See application file for complete search history.

(56) References Cited

U.S. PATENT DOCUMENTS

| | | | |
|---|---|---|---|
| 4,858,048 A * | 8/1989 | Hayakawa et al. | 360/121 |
| 6,954,340 B2 | 10/2005 | Shukh et al. | |
| 8,054,578 B2 * | 11/2011 | Kameda et al. | 360/119.04 |
| 8,072,706 B2 * | 12/2011 | Hirata et al. | 360/125.07 |
| 2005/0141137 A1 | 6/2005 | Okada et al. | |
| 2006/0103980 A1 * | 5/2006 | Sasaki et al. | 360/126 |
| 2007/0177301 A1 | 8/2007 | Han et al. | |
| 2008/0239567 A1 | 10/2008 | Sasaki et al. | |
| 2009/0002884 A1 * | 1/2009 | Sasaki et al. | 360/125.02 |
| 2009/0059426 A1 * | 3/2009 | Sasaki et al. | 360/125.02 |
| 2009/0296275 A1 * | 12/2009 | Sasaki et al. | 360/125.3 |
| 2010/0061016 A1 * | 3/2010 | Han et al. | 360/125.3 |

* cited by examiner

*Primary Examiner* — Brian Miller
(74) *Attorney, Agent, or Firm* — Oliff & Berridge, PLC

(57) ABSTRACT

A magnetic head includes a main pole, a write shield, and a gap part. The write shield includes first and second side shields and a top shield. The main pole has first and second side parts. The first side shield has a first sidewall. The second side shield has a second sidewall. The gap part includes a gap film and a nonmagnetic layer. The gap film is disposed to be in contact with the first and second sidewalls. The first side part has first and third side surfaces arranged in this order from the medium facing surface side. The second side part has second and fourth side surfaces arranged in this order from the medium facing surface side. The nonmagnetic layer is present between the third side surface and the first sidewall and between the fourth side surface and the second sidewall.

9 Claims, 13 Drawing Sheets

MAGNETIC HEAD FOR PERPENDICULAR MAGNETIC RECORDING HAVING A MAIN POLE AND A SHIELD

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and a shield, and a method of manufacturing the same.

2. Description of Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head having a magnetoresistive element (hereinafter, also referred to as MR element) for reading and a write head having an induction-type electromagnetic transducer for writing are stacked on a substrate. The write head includes a main pole that produces a magnetic field in a direction perpendicular to the plane of the recording medium. The main pole includes, for example, a track width defining portion having an end located in a medium facing surface that faces the recording medium, and a wide portion that is connected to the other end of the track width defining portion and is greater in width than the track width defining portion. The track width defining portion has a generally constant width. To achieve higher recording density, it is required that the write head of the perpendicular magnetic recording system be smaller in track width and improved in write characteristics such as overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end and an air outflow end. The slider is designed to slightly fly over the surface of the recording medium by means of an airflow that comes from the air inflow end into the space between the medium facing surface and the recording medium. The magnetic head is typically disposed near the air outflow end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erase). To increase the recording density, it is required to prevent the occurrence of adjacent track erase.

One known technique for preventing the skew-induced adjacent track erase is to form the main pole such that its end face located in the medium facing surface has a width that decreases with increasing proximity to the top surface of the substrate, as described in U.S. Patent Application Publication No. 2005/0141137 A1, U.S. Patent Application Publication No. 2007/0177301 A1, and U.S. Pat. No. 6,954,340 B2, for example.

Another effective technique for preventing the skew-induced adjacent track erase is to provide two side shields on opposite sides of the main pole in the track width direction, as described in U.S. Patent Application Publication No. 2005/0141137 A1 and U.S. Patent Application Publication No. 2007/0177301 A1. It is also effective to provide a shield having an end face that is located in the medium facing surface and wraps around the end face of the main pole (such a shield will hereinafter be referred to as a wrap-around shield), as described in U.S. Pat. No. 6,954,340 B2. The wrap-around shield includes a bottom shield that is located on the air-inflow-end side relative to the main pole, a top shield that is located on the air-outflow-end side relative to the main pole, and two side shields that are located on opposite sides of the main pole in the track width direction. The aforementioned techniques make it possible to capture a magnetic flux that is produced from the end face of the main pole and spreads out in the track width direction. It is thereby possible to prevent the occurrence of adjacent track erase.

A main pole that is shaped such that its end face located in the medium facing surface decreases in width with increasing proximity to the top surface of the substrate has the following problem. If the main pole of such a shape is formed by a conventional method of forming a main pole, a major part of the side surface of the main pole along the entire perimeter of the main pole is formed into a tilt surface tilted with respect to a direction perpendicular to the top surface of the substrate. This makes the main pole smaller in cross-sectional area perpendicular to the direction of flow of the magnetic flux, as compared with a case where the entire side surface of the main pole is perpendicular to the top surface of the substrate. Such a main pole cannot allow much magnetic flux to pass, especially through a part near the boundary between the track width defining portion and the wide portion. This results in degradation of write characteristics such as overwrite property.

An effective approach to the aforementioned problem is, as disclosed in U.S. Patent Application Publication No. 2008/0239567 A1, to form the main pole into the following shape. The main pole formed by the technique disclosed therein has first and second side surfaces that are opposite to each other and located in a first region extending from the medium facing surface to a position at a predetermined distance from the medium facing surface, and third and fourth side surfaces that are located in a second region other than the first region. The main pole further has a fifth side surface located in the boundary between the first and second regions and connecting the first side surface to the third side surface, and a sixth side surface located in the boundary between the first and second regions and connecting the second side surface to the fourth side surface. The distance between the first side surface and the second side surface in the track width direction decreases with increasing proximity to the top surface of the substrate. In the boundary between the first region and the second region, the distance between the third side surface and the fourth side surface in the track width direction as seen at the position closest to the top surface of the substrate is greater than the distance between the first side surface and the second side surface in the track width direction as seen at the position closest to the top surface of the substrate. Each of the fifth and sixth side surfaces has a width that increases with increasing proximity to the top surface of the substrate. This technique allows the main pole to have a large cross-sectional area perpendicular to the direction of flow of the magnetic flux in the vicinity of the boundary between the track width defining portion and the wide portion, thereby allowing much magnetic flux to pass. This makes it possible to improve write characteristics such as overwrite property.

Here, a magnetic head that is configured to have a main pole of the above-described shape and two side shields will be contemplated. The two side shields have respective sidewalls that are opposed to two side parts of the main pole. In order for the two side shields to sufficiently capture a magnetic flux that is produced from the end face of the main pole and spreads out to opposite areas in the track width direction, it is preferred that the distance from the side parts of the main pole to the sidewalls of the side shields be small and constant in the medium facing surface.

If the sidewalls of the side shields are opposed to the side parts of the main pole at a small distance therefrom over a wide area except the medium facing surface, flux leakage from the main pole to the side shields will increase to cause degradation of write characteristics such as overwrite property. To avoid this, the side shields might be reduced in dimension in the direction perpendicular to the medium facing surface. Such a reduction in dimension, however, makes the side shields smaller in volume and thus impairs the original function of the side shields.

OBJECT AND SUMMARY OF THE INVENTION

It is an object of the present invention to provide a magnetic head for perpendicular magnetic recording that includes a main pole and a shield and is capable of achieving both the prevention of adjacent track erase and the improvement of write characteristics, and to provide a method of manufacturing such a magnetic head.

A magnetic head for perpendicular magnetic recording of the present invention includes: a medium facing surface that faces a recording medium; a coil that produces a magnetic field corresponding to data to be written on the recording medium; a main pole that has an end face located in the medium facing surface, the main pole allowing a magnetic flux corresponding to the magnetic field produced by the coil to pass, and producing a write magnetic field for writing the data on the recording medium by means of a perpendicular magnetic recording system; a write shield made of a magnetic material; a gap part made of a nonmagnetic material and provided between the main pole and the write shield; and a substrate having a top surface.

The coil, the main pole, the write shield, and the gap part are located above the top surface of the substrate. The write shield includes first and second side shields, and a top shield that is in contact with the first and second side shields. The first and second side shields have two end faces that are located in the medium facing surface at positions on opposite sides of the end face of the main pole in the track width direction. The top shield has an end face that is located in the medium facing surface at a position forward of the end face of the main pole along the direction of travel of the recording medium.

The main pole has a first side part and a second side part that are opposed to each other in the track width direction. The first side shield has a first sidewall that faces the first side part of the main pole. The second side shield has a second sidewall that faces the second side part of the main pole. The gap part includes a gap film that is disposed to be in contact with the first and second sidewalls, and a nonmagnetic layer that is located away from the medium facing surface and interposed between the gap film and the first and second side parts.

The first side part has a first side surface located in a first region and a third side surface located in a second region other than the first region, the first region extending from the medium facing surface to a position at a predetermined distance from the medium facing surface. The second side part has a second side surface located in the first region and a fourth side surface located in the second region. The nonmagnetic layer is not present between the first side surface and the first sidewall or between the second side surface and the second sidewall, but is present between the third side surface and the first sidewall and between the fourth side surface and the second sidewall. The distance between the third side surface and the first sidewall in the track width direction is greater than the distance between the first side surface and the first sidewall in the track width direction. The distance between the fourth side surface and the second sidewall in the track width direction is greater than the distance between the second side surface and the second sidewall in the track width direction.

The distance between the first side surface and the second side surface in the track width direction decreases with increasing proximity to the top surface of the substrate. Angles that are formed by the third and fourth side surfaces with respect to a direction perpendicular to the top surface of the substrate are smaller than angles that are formed by the first and second side surfaces with respect to the direction perpendicular to the top surface of the substrate.

In the magnetic head for perpendicular magnetic recording of the present invention, the distance from the medium facing surface to the boundary between the first region and the second region may fall within the range of 80 to 620 nm. The write shield may further include a bottom shield that is in contact with the first and second side shields. The bottom shield has an end face that is located in the medium facing surface at a position backward of the end face of the main pole along the direction of travel of the recording medium.

In the magnetic head for perpendicular magnetic recording of the present invention, the main pole may include a portion where the distance between the first side part and the second side part in the track width direction increases with increasing distance from the medium facing surface. The first sidewall may have a first wall face located in the first region, and a third wall face that is located farther from the medium facing surface than is the first wall face. The second sidewall may have a second wall face located in the first region, and a fourth wall face that is located farther from the medium facing surface than is the second wall face. In at least part of the first region, the distance between the first wall face and the second wall face in the track width direction may increase with increasing distance from the medium facing surface. In at least part of the second region, the distance between the third wall face and the fourth wall face in the track width direction may increase with increasing distance from the medium facing surface. At positions in the first and second side shields farthest from the top surface of the substrate, angles that are formed by the third and fourth wall faces with respect to a direction perpendicular to the medium facing surface in the at least part of the second region may be greater than angles that are formed by the first and second wall faces with respect to the direction perpendicular to the medium facing surface in the at least part of the first region.

The first sidewall may further have a fifth wall face that connects the first wall face and the third wall face to each other. The second sidewall may further have a sixth wall face that connects the second wall face and the fourth wall face to each other. At the positions in the first and second side shields farthest from the top surface of the substrate, angles that are formed by the fifth and sixth wall faces with respect to the direction perpendicular to the medium facing surface may be greater than the angles that are formed by the third and fourth wall faces with respect to the direction perpendicular to the medium facing surface in the at least part of the second region.

At the positions in the first and second side shields farthest from the top surface of the substrate, a minimum distance from the medium facing surface to the fifth and sixth wall faces may fall within the range of 50 to 500 nm.

A method of manufacturing the magnetic head for perpendicular magnetic recording of the present invention includes the steps of: forming the first and second side shields; forming the gap film after the first and second side shields are formed; forming the main pole and the nonmagnetic layer after the gap film is formed; forming the top shield after the main pole and the nonmagnetic layer are formed; and forming the coil.

In the method of manufacturing the magnetic head for perpendicular magnetic recording of the present invention, the step of forming the main pole and the nonmagnetic layer includes the steps of: forming a mold on the gap film, the mold having an opening; forming a preliminary main pole by using the mold, the preliminary main pole being intended to later become the main pole; removing the mold after the preliminary main pole is formed; forming a preliminary nonmagnetic layer after the mold is removed, the preliminary nonmagnetic layer being intended to later become the nonmagnetic layer and being formed to cover the first and second side shields, the gap film and the preliminary main pole; and polishing the preliminary nonmagnetic layer until the first and second side shields and the preliminary main pole are exposed.

In the method of manufacturing the magnetic head for perpendicular magnetic recording of the present invention, the write shield may further include a bottom shield that is in contact with the first and second side shields. The bottom shield may have an end face that is located in the medium facing surface at a position backward of the end face of the main pole along the direction of travel of the recording medium. In this case, the method of manufacturing the magnetic head for perpendicular magnetic recording further includes the step of forming the bottom shield before the first and second side shields are formed. The first and second side shields are formed on the bottom shield.

In the magnetic head for perpendicular magnetic recording and its manufacturing method, the distance between the first side surface and the second side surface in the track width direction in the main pole decreases with increasing proximity to the top surface of the substrate. Consequently, the end face of the main pole located in the medium facing surface decreases in width in the track width direction with increasing proximity to the top surface of the substrate. According to the present invention, it is thereby possible to prevent the occurrence of adjacent track erase.

In the present invention, the angles that the third and fourth side surfaces form with respect to the direction perpendicular to the top surface of the substrate are smaller than the angles that the first and second side surfaces form with respect to the direction perpendicular to the top surface of the substrate. According to the present invention, it is therefore possible for the main pole to have a large cross-sectional area perpendicular to the direction of flow of the magnetic flux in the second region, and consequently, it is possible to improve write characteristics.

In the present invention, the nonmagnetic layer is not present between the first side surface and the first sidewall or between the second side surface and the second sidewall, but is present between the third side surface and the first sidewall and between the fourth side surface and the second sidewall. In addition, the distance between the third side surface and the first sidewall in the track width direction is greater than the distance between the first side surface and the first sidewall in the track width direction, and the distance between the fourth side surface and the second sidewall in the track width direction is greater than the distance between the second side surface and the second sidewall in the track width direction. According to the present invention, it is thus possible to prevent flux leakage from the main pole to the side shields without impairing the function of the side shields. From the foregoing, the present invention makes it possible to achieve both the prevention of adjacent track erase and the improvement of write characteristics.

Other objects, features and advantages of the present invention will become fully apparent from the following description.

DETAILED DESCRIPTION OF THE PREFERRED EMBODIMENT

Figure 1:
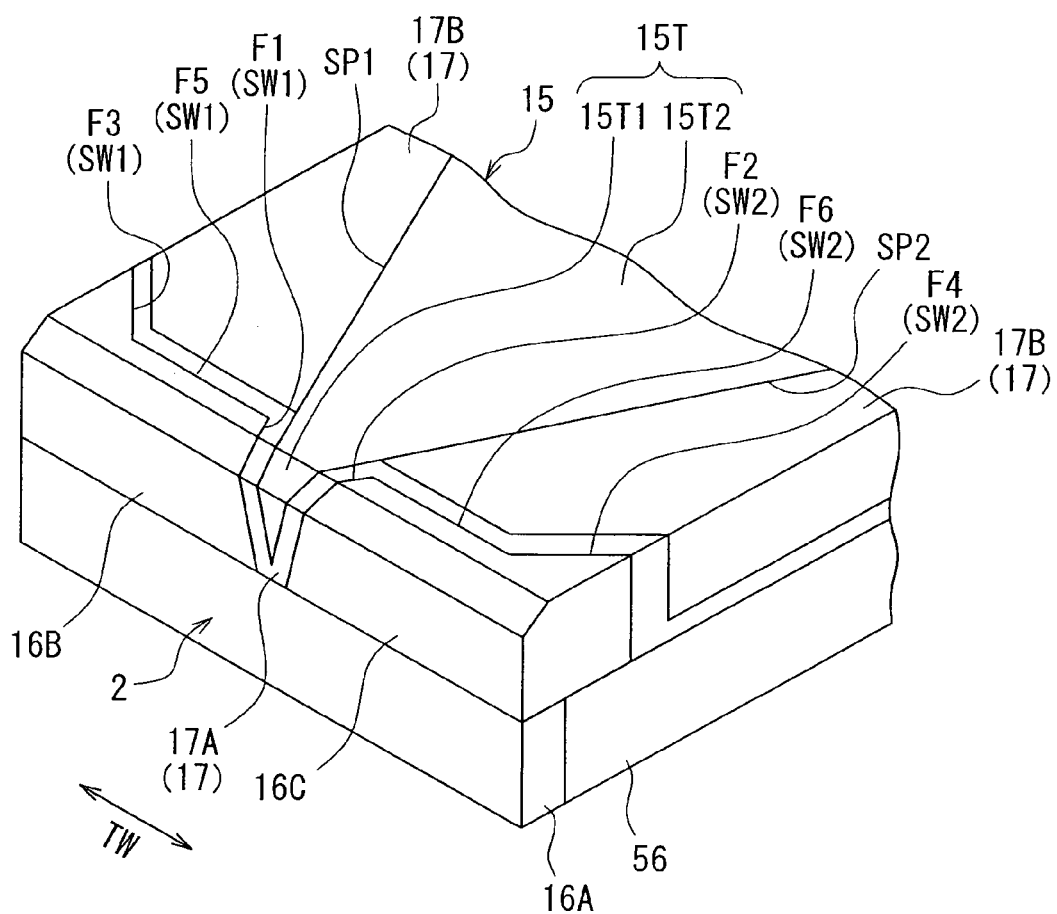
FIG. 1 is a perspective view showing a main pole, two side shields, a bottom shield, and a gap part in an area near the medium facing surface of a magnetic head according to an embodiment of the invention.
Figure 2:
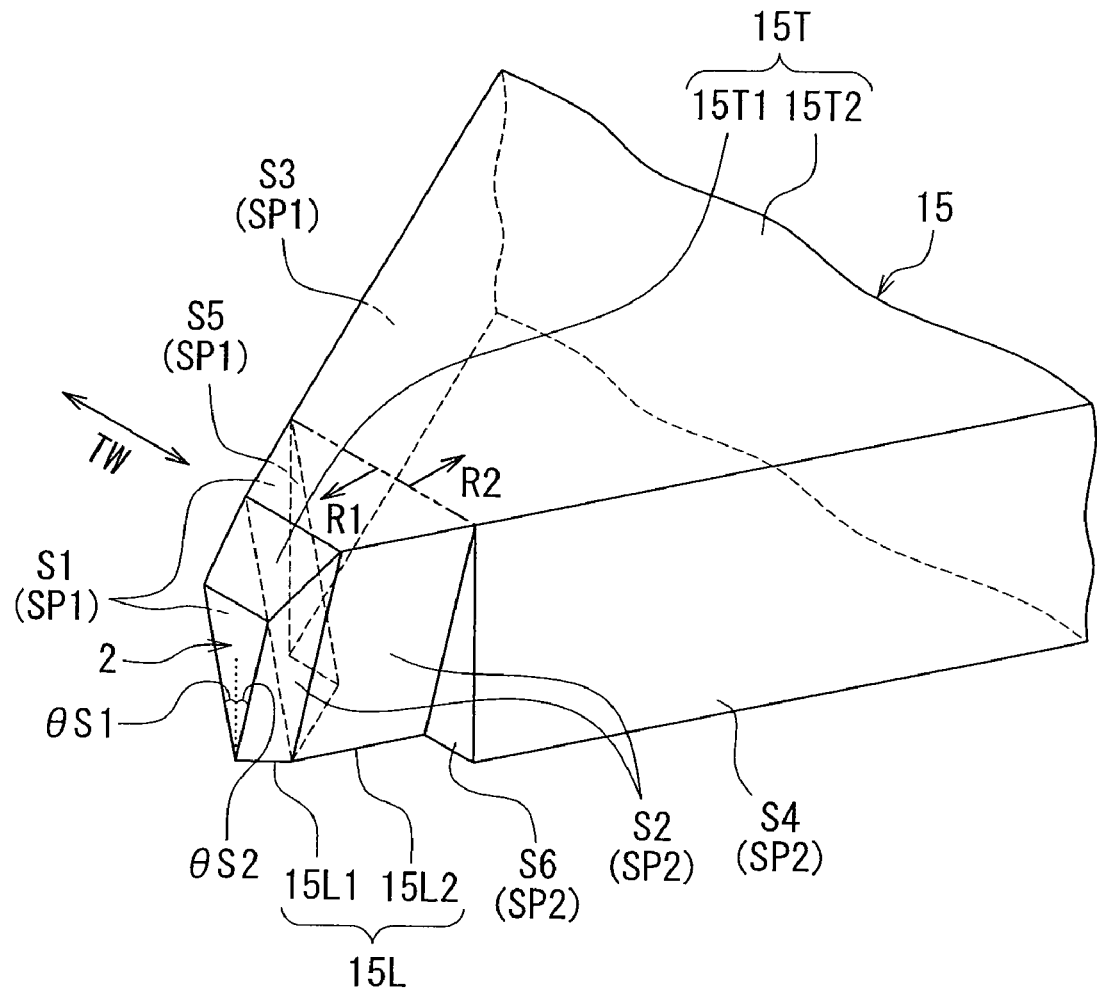
FIG. 2 is a perspective view showing the main pole in the area near the medium facing surface of the embodiment of the invention.
Figure 3:
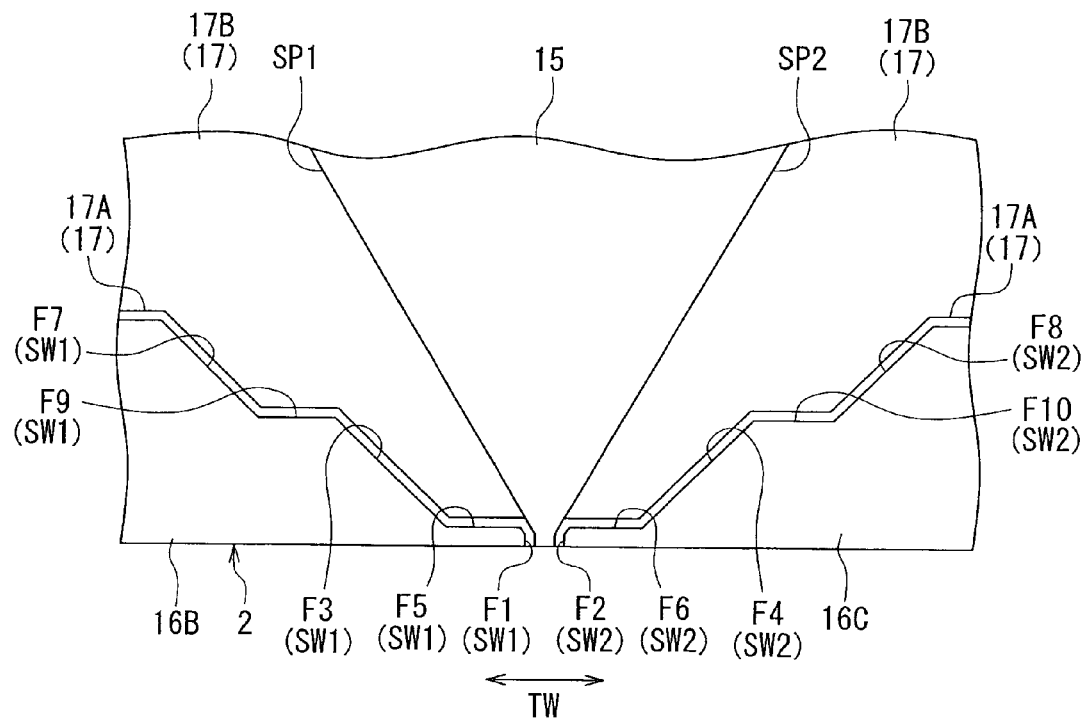
FIG. 3 is a plan view showing the main pole, the two side shields, and the gap part in the area near the medium facing surface of the embodiment of the invention.
Figure 4:
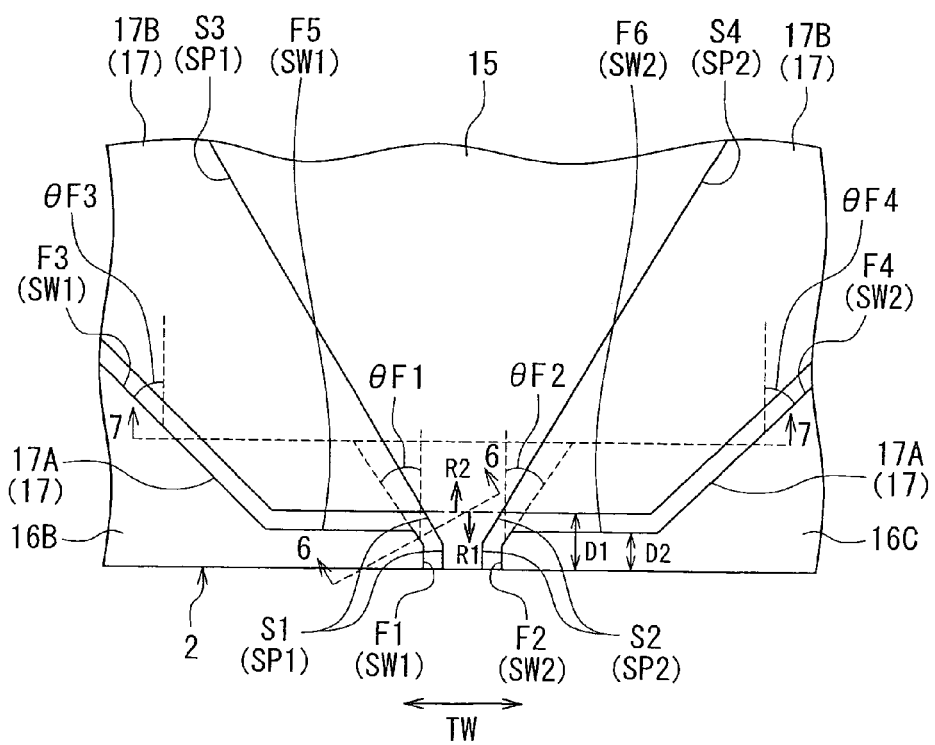
FIG. 4 is a magnified plan view of a part of FIG. 3.
Figure 5:
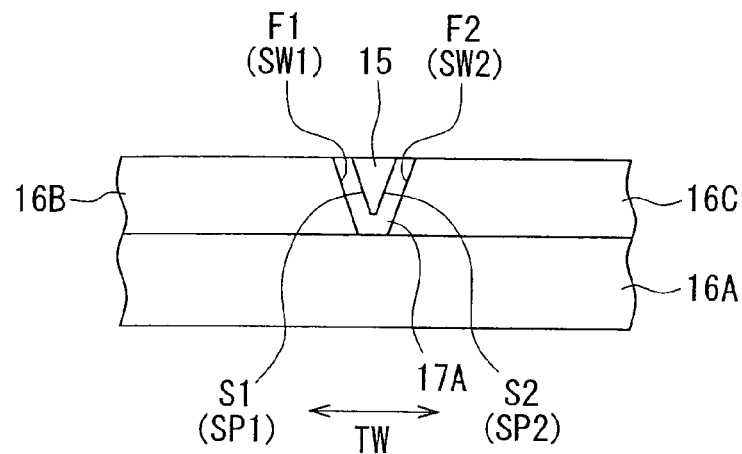
FIG. 5 is a front view showing respective end faces of the main pole and the two side shields located in the medium facing surface of the embodiment of the invention.
Figure 6:
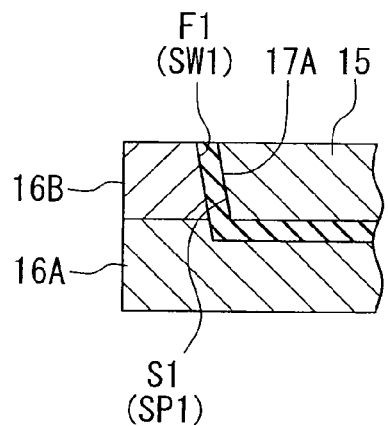
FIG. 6 shows a cross section taken along line 6-6 of FIG. 4.
Figure 7:
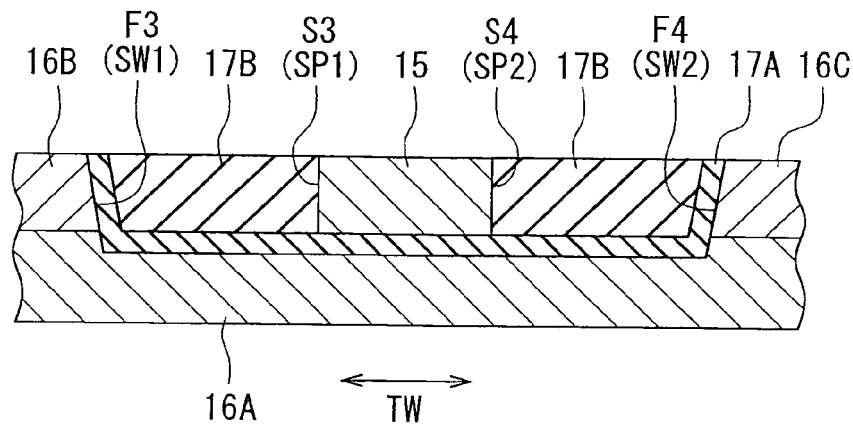
FIG. 7 shows a cross section taken along line 7-7 of FIG. 4.
Figure 8:
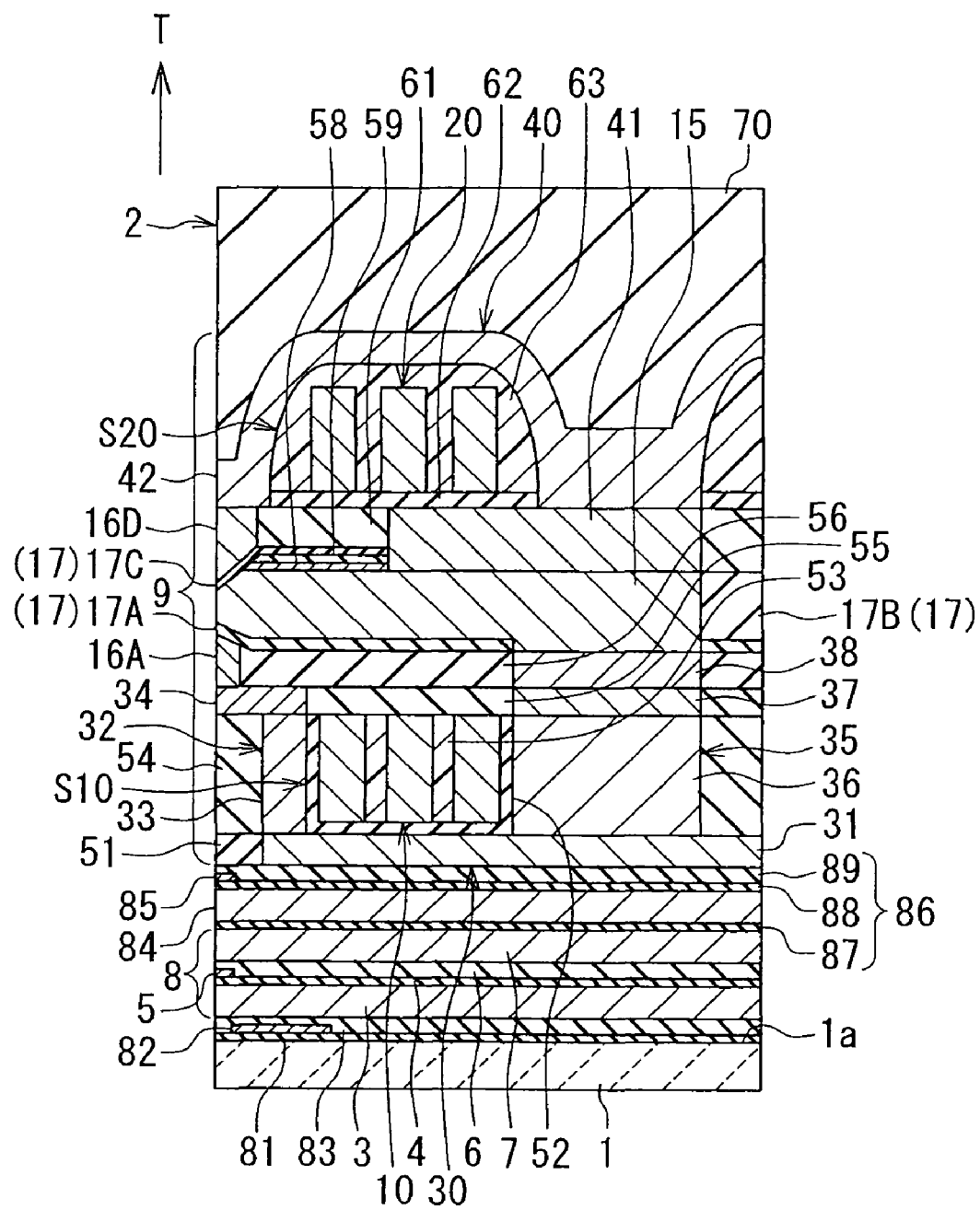
FIG. 8 is a cross-sectional view showing the configuration of the magnetic head according to the embodiment of the invention.
Figure 9:
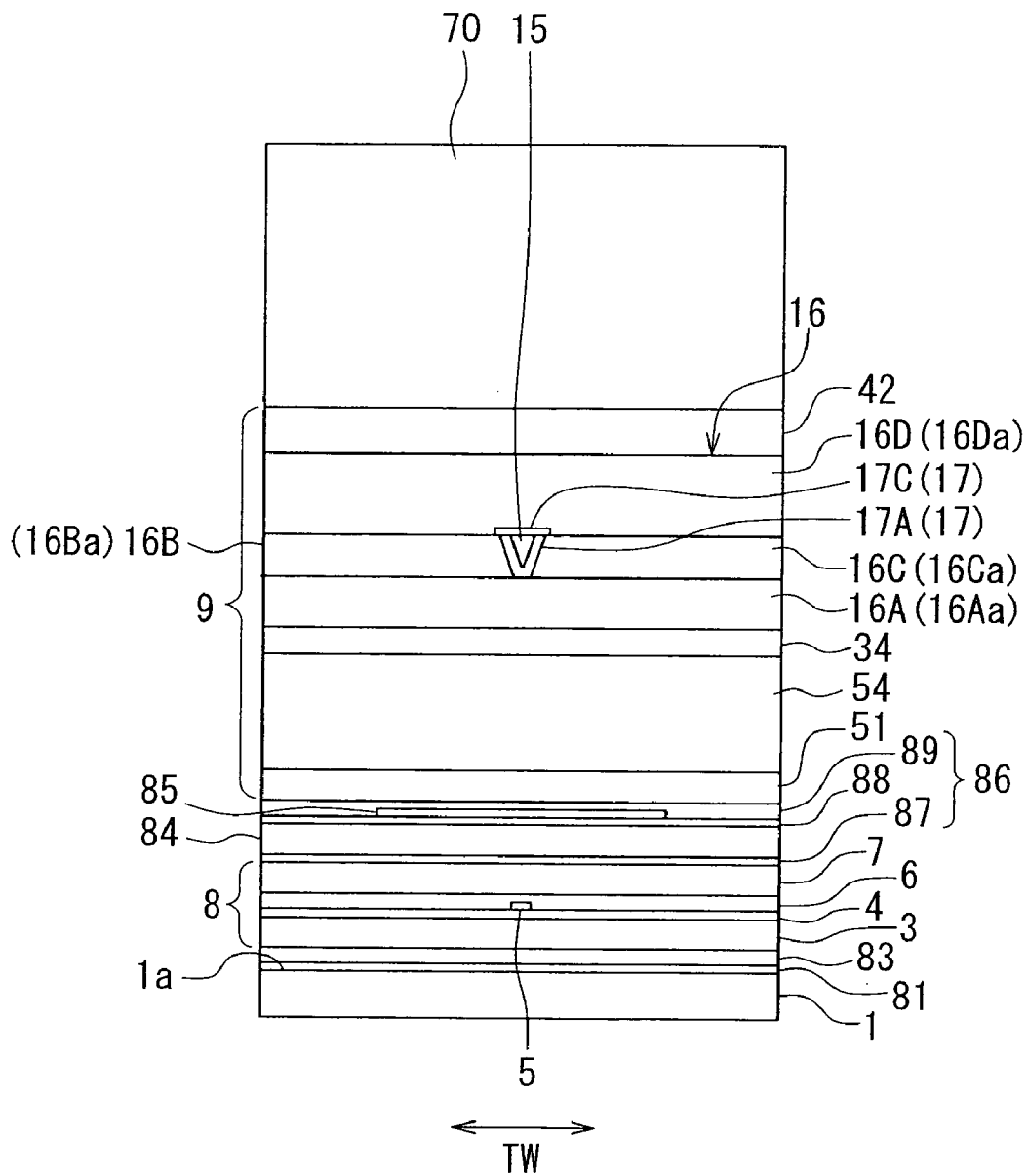
FIG. 9 is a front view showing the medium facing surface of the magnetic head according to the embodiment of the invention.

An embodiment of the present invention will now be described in detail with reference to the drawings. First, reference is made to FIG. 1 to FIG. 9 to describe the configuration of a magnetic head according to the embodiment of the invention. The magnetic head according to the embodiment is for use in perpendicular magnetic recording. FIG. 1 is a perspective view showing a main pole, two side shields, a bottom shield, and a gap part in an area near the medium facing surface of the magnetic head according to the embodiment. FIG. 2 is a perspective view of the main pole in the area near the medium facing surface of the embodiment. FIG. 3 is a plan view showing the main pole, the two side shields, and the gap part in the area near the medium facing surface of the embodiment. FIG. 4 is a magnified plan view of a part of FIG. 3. FIG. 5 is a front view showing respective end faces of the main pole and the two side shields located in the medium facing surface of the embodiment. FIG. 6 shows a cross section taken along line 6-6 of FIG. 4. FIG. 7 shows a cross section taken along line 7-7 of FIG. 4. FIG. 8 is a cross-sectional view showing the configuration of the magnetic head according to the embodiment. FIG. 9 is a front view showing the medium facing surface of the magnetic head according to the embodiment. The arrows with the symbol TW in FIG. 1 to FIG. 5 and FIG. 7 indicate the track width direction. FIG. 8 shows a cross section perpendicular to the medium facing surface and the top surface of the substrate. The arrow with the symbol T in FIG. 8 indicates the direction of travel of a recording medium.

As shown in FIG. 8, the magnetic head according to the embodiment has a medium facing surface 2 that faces the recording medium. As shown in FIG. 8 and FIG. 9, the magnetic head includes: a substrate 1 made of a ceramic material such as aluminum oxide-titanium carbide ($Al_2O_3$—TiC) and having a top surface 1a; an insulating layer 81 made of an insulating material and disposed on the top surface 1a of the substrate 1; a heater 82 disposed on the insulating layer 81; and an insulating layer 83 made of an insulating material and disposed to cover the insulating layer 81 and the heater 82. The insulating layers 81 and 83 are made of alumina ($Al_2O_3$), for example. The heater 82 generates heat for causing part of the medium facing surface 2 to protrude.

The magnetic head further includes a read head unit 8 disposed forward along the direction T of travel of the recording medium (i.e., disposed on the trailing end side) relative to the heater 82. The read head unit 8 includes: a first read shield layer 3 made of a magnetic material and disposed on the insulating layer 83; a first read shield gap film 4 which is an insulating film disposed on the first read shield layer 3; a magnetoresistive (MR) element 5 serving as a read element disposed on the first read shield gap film 4; two leads (not shown) connected to the MR element 5; a second read shield gap film 6 which is an insulating film disposed over the MR element 5 and the leads; and a second read shield layer 7 made of a magnetic material and disposed on the second read shield gap film 6.

An end of the MR element 5 is located in the medium facing surface 2. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of layers constituting the GMR element.

The magnetic head further includes: a write head unit 9 disposed forward along the direction T of travel of the recording medium relative to the read head unit 8; and an expansion layer 84, a sensor 85, and a nonmagnetic part 86 disposed between the read head unit 8 and the write head unit 9. The nonmagnetic part 86 is made of a nonmagnetic material. The material of the nonmagnetic part 86 may be alumina, for example.

The nonmagnetic part 86 includes nonmagnetic layers 87, 88, and 89. The nonmagnetic layer 87 is disposed on the second read shield layer 7. The expansion layer 84 is disposed on the nonmagnetic layer 87. The nonmagnetic layer 88 is disposed on the expansion layer 84. The sensor 85 is disposed on the nonmagnetic layer 88. The nonmagnetic layer 89 is disposed to cover the sensor 85.

The write head unit 9 includes a coil, a main pole 15, a write shield 16, and a gap part 17. The coil includes a first portion 10 and a second portion 20. The first portion 10 and the second portion 20 are both made of a conductive material such as copper. The first portion 10 and the second portion 20 are both planar spiral-shaped. The first portion 10 and the second portion 20 are connected in series or in parallel.

The coil including the first and second portions 10 and 20 produces a magnetic field corresponding to data to be written on the recording medium. The main pole 15 has an end face located in the medium facing surface 2. The main pole 15 allows a magnetic flux corresponding to the magnetic field produced by the coil to pass, and produces a write magnetic field for writing data on the recording medium by means of the perpendicular magnetic recording system. FIG. 8 shows a cross section that intersects the end face of the main pole 15 located in the medium facing surface 2 and that is perpendicular to the medium facing surface 2 and the top surface 1a of the substrate 1.

The write shield 16 has an end face that is located in the medium facing surface 2 to wrap around the end face of the main pole 15. The write shield 16 is made of a magnetic material. Examples of materials that can be used for the write shield 16 include CoFeN, CoNiFe, NiFe, and CoFe.

The write shield 16 includes a bottom shield 16A, a first side shield 16B, a second side shield 16C, and a top shield 16D that are magnetically coupled to each other. The side shields 16B and 16C are disposed on opposite sides of the main pole 15 in the track width direction TW. The bottom shield 16A is located backward of the side shields 16B and 16C along the direction T of travel of the recording medium and is in contact with the side shields 16B and 16C. The top shield 16D is located forward of the side shields 16B and 16C along the direction T of travel of the recording medium and is in contact with the side shields 16B and 16C.

The bottom shield 16A has an end face 16Aa that is located in the medium facing surface 2 at a position backward of the end face of the main pole 15 along the direction T of travel of the recording medium. The side shields 16B and 16C have two end faces 16Ba and 16Ca that are located in the medium facing surface 2 at positions on opposite sides of the end face of the main pole 15 in the track width direction TW. The top shield 16D has an end face 16Da that is located in the medium facing surface 2 at a position forward of the end face of the main pole 15 along the direction T of travel of the recording medium.

The write head unit 9 further includes a first return path section 30 and a second return path section 40. The first and second return path sections 30 and 40 are both made of a magnetic material. Examples of materials that can be used for the first and second return path sections 30 and 40 include CoFeN, CoNiFe, NiFe, and CoFe. The first return path section 30 is disposed backward of the main pole 15 along the direction T of travel of the recording medium and contacts the write shield 16 and the main pole 15, thereby magnetically coupling the write shield 16 and the main pole 15 to each other. The second return path section 40 is disposed forward of the main pole 15 along the direction T of travel of the recording medium and contacts the write shield 16 and the main pole 15, thereby magnetically coupling the write shield 16 and the main pole 15 to each other.

The first return path section 30 includes: a yoke layer 31 disposed backward of the main pole 15 along the direction T of travel of the recording medium; a first coupling part 32 that couples the yoke layer 31 and the write shield 16 to each other; and a second coupling part 35 that is located away from the medium facing surface 2 and couples the yoke layer 31 and the main pole 15 to each other. The first coupling part 32 includes magnetic layers 33 and 34. The second coupling part 35 includes magnetic layers 36, 37, and 38.

The yoke layer 31 is disposed on the nonmagnetic layer 89. The magnetic layers 33 and 36 are both disposed on the yoke layer 31. The magnetic layer 33 is located near the medium facing surface 2. The magnetic layer 36 is located farther from the medium facing surface 2 than is the magnetic layer 33. The yoke layer 31 and the magnetic layer 33 have their respective end faces facing toward the medium facing surface 2. These end faces are located at a distance from the medium facing surface 2.

The magnetic head further includes: an insulating layer 51 made of an insulating material, disposed on the nonmagnetic layer 89 and surrounding the yoke layer 31; an insulating film 52 made of an insulating material and interposed between the first portion 10 of the coil and each of the yoke layer 31 and the magnetic layers 33 and 36; an insulating layer 53 made of an insulating material and disposed in the space between every adjacent turns of the first portion 10; and an insulating layer 54 made of an insulating material and disposed around the magnetic layers 33 and 36 and the first portion 10. The top surfaces of the first portion 10, the magnetic layers 33 and 36, the insulating film 52 and the insulating layers 53 and 54 are even with each other. The insulating layers 51 and 54 and the insulating film 52 are made of alumina, for example. The insulating layer 53 is made of photoresist, for example. The first portion 10 is wound around the magnetic layer 36 which is a part of the first return path section 30.

The magnetic layer 34 is disposed on the magnetic layer 33 and the insulating layer 54. The magnetic layer 37 is disposed on the magnetic layer 36. The magnetic layer 34 has an end face located in the medium facing surface 2. The magnetic head further includes an insulating layer 55 made of an insulating material and disposed on the top surfaces of the first portion 10, the insulating film 52 and the insulating layers 53 and 54 around the magnetic layers 34 and 37. The insulating layer 55 is made of alumina, for example. The top surfaces of the magnetic layers 34 and 37 and the insulating layer 55 are even with each other.

The bottom shield 16A is disposed on the magnetic layer 34. The magnetic layer 38 is disposed on the magnetic layer 37. The magnetic head further includes an insulating layer 56 made of an insulating material and disposed on part of the top surface of the magnetic layer 34 and the top surface of the insulating layer 55 around the bottom shield 16A and the magnetic layer 38. The insulating layer 56 is made of alumina, for example.

As shown in FIG. 2, the main pole 15 has: a bottom end 15L which is an end closer to the top surface 1a of the substrate 1; a top surface 15T opposite to the bottom end 15L; and first and second side parts SP1 and SP2 that are opposite to each other in the track width direction TW. The side shield 16B has a first sidewall SW1 that faces the first side part SP1 of the main pole 15. The side shield 16C has a second sidewall SW2 that faces the second side part SP2 of the main pole 15.

The gap part 17 is made of a nonmagnetic material and disposed between the main pole 15 and the write shield 16. The gap part 17 includes a gap film 17A, a nonmagnetic layer 17B, and a gap layer 17C. The gap film 17A is disposed to be in contact with the first and second sidewalls SW1 and SW2. The nonmagnetic layer 17B is located away from the medium facing surface 2 and interposed between the gap film 17A and each of the first and second side parts SP1 and SP2. The gap layer 17C is disposed at least between the main pole 15 and the top shield 16D.

The side shields 16B and 16C are disposed on the bottom shield 16A and in contact with the bottom shield 16A. The gap film 17A is arranged to extend along the sidewalls SW1 and SW2 of the side shields 16B and 16C, the top surface of the bottom shield 16A, and the top surface of the insulating layer 56. The nonmagnetic material used to form the gap film 17A may be an insulating material or a nonmagnetic metal material. Alumina is an example of insulating materials that can be used to form the gap film 17A. Ru is an example of nonmagnetic metal materials that can be used to form the gap film 17A. The gap film 17A has an opening for exposing the top surface of the magnetic layer 38.

The main pole 15 is disposed over the bottom shield 16A and the insulating layer 56 such that the gap film 17A is interposed between the main pole 15 and the top surfaces of the bottom shield 16A and the insulating layer 56. As shown in FIG. 1, the gap film 17A is interposed also between the main pole 15 and each of the side shields 16B and 16C in the medium facing surface 2.

The bottom end 15L of the main pole 15 is in contact with the top surface of the magnetic layer 38 at a position away from the medium facing surface 2. The main pole 15 is made of a magnetic metal material. Examples of materials that can be used for the main pole 15 include NiFe, CoNiFe, and CoFe. The shape of the main pole 15 will be described in detail later.

The magnetic head further includes: a nonmagnetic metal layer 58 made of a nonmagnetic metal material and disposed on part of the top surface 15T of the main pole 15 at a position away from the medium facing surface 2; and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The gap layer 17C is disposed to cover the main pole 15, the nonmagnetic metal layer 58, and the insulating layer 59. Examples of materials that can be used for the gap layer 17C include nonmagnetic insulating materials such as alumina, and nonmagnetic conductive materials such as Ru, NiCu, Ta, W, NiB, and NiP.

The top shield 16D is disposed over the side shields 16B and 16C and the gap layer 17C, and is in contact with the side shields 16B and 16C. In the medium facing surface 2, part of the end face of the top shield 16D is spaced from the end face of the main pole 15 by a predetermined distance created by the thickness of the gap layer 17C. The thickness of the gap layer 17C preferably falls within the range of 5 to 60 nm, and may be 30 to 60 nm, for example. The end face of the main pole 15 has a side that is adjacent to the gap layer 17C, and the side defines the track width.

The second return path section 40 includes a yoke layer 41 and a magnetic layer 42. The yoke layer 41 is disposed on the main pole 15 at a position away from the medium facing surface 2. The magnetic head further includes a nonmagnetic layer 61 disposed around the top shield 16D and the yoke layer 41. The nonmagnetic layer 61 is made of an inorganic insulating material, for example. The inorganic insulating material may be alumina or silicon oxide, for example. The top surfaces of the top shield 16D, the yoke layer 41 and the nonmagnetic layer 61 are even with each other.

The magnetic head further includes an insulating layer 62 made of an insulating material and disposed on part of the top surfaces of the yoke layer 41 and the nonmagnetic layer 61. The insulating layer 62 is made of alumina, for example. At least part of the second portion 20 of the coil is disposed on the insulating layer 62. The magnetic head further includes an insulating layer 63 made of an insulating material and disposed to cover the second portion 20. The insulating layer 63 is made of photoresist, for example.

The magnetic layer 42 is disposed over the top shield 16D, the yoke layer 41 and the insulating layer 63, and connects the top shield 16D and the yoke layer 41 to each other. The magnetic layer 42 has an end face located in the medium facing surface 2. The second portion 20 is wound around a portion of the magnetic layer 42 lying on the yoke layer 41. The magnetic layer 42 constitutes part of the second return path section 40.

The magnetic head further includes a protection layer 70 made of a nonmagnetic material and disposed to cover the magnetic layer 42 and the insulating layers 62 and 63. The protection layer 70 is made of, for example, an inorganic insulating material such as alumina.

As has been described, the magnetic head according to the embodiment includes the medium facing surface 2, the read head unit 8, and the write head unit 9. The medium facing surface 2 faces the recording medium. The read head unit 8 and the write head unit 9 are stacked on the substrate 1. Relative to the read head unit 8, the write head unit 9 is disposed forward along the direction T of travel of the recording medium (i.e., disposed on the trailing end side).

The write head unit 9 includes: the coil including the first portion 10 and the second portion 20; the main pole 15; the write shield 16; the gap part 17; and the first and second return path sections 30 and 40. The write shield 16 includes the bottom shield 16A, the two side shields 16B and 16C, and the top shield 16D. The gap part 17 includes the gap film 17A, the nonmagnetic layer 17B, and the gap layer 17C.

The first return path section 30 includes the yoke layer 31 and the first and second coupling parts 32 and 35. The yoke layer 31 is disposed backward of the main pole 15 along the direction T of travel of the recording medium. The first coupling part 32 includes the magnetic layers 33 and 34. The second coupling part 35 includes the magnetic layers 36, 37, and 38. As shown in FIG. 8, the first return path section 30 connects the write shield 16 and the main pole 15 to each other so that a first space S10 is defined by the main pole 15, the gap part 17 (the gap film 17A), the write shield 16 and the first return path section 30, thereby magnetically coupling the write shield 16 and the main pole 15 to each other. The first portion 10 of the coil passes through the first space S10.

The second return path section 40 includes the yoke layer 41 and the magnetic layer 42. As shown in FIG. 8, the second return path section 40 connects the write shield 16 and the main pole 15 to each other so that a second space S20 is defined by the main pole 15, the gap part 17 (the gap layer 17C), the write shield 16 and the second return path section 40, thereby magnetically coupling the write shield 16 and the main pole 15 to each other. The second portion 20 of the coil passes through the second space S20.

The magnetic head according to the embodiment further includes the heater 82, the expansion layer 84, the sensor 85, and the nonmagnetic part 86. The expansion layer 84, the sensor 85, and the nonmagnetic part 86 are disposed between the read head unit 8 and the write head unit 9. Relative to the expansion layer 84 and the sensor 85, the heater 82 is located backward along the direction T of travel of the recording medium (i.e., located on the leading end side). The nonmagnetic part 86 is disposed around the expansion layer 84 and the sensor 85.

The heater 82, the expansion layer 84, and the sensor 85 will be described in detail below. The heater 82 and the expansion layer 84 are provided for causing part of the medium facing surface 2 to protrude so as to reduce the distance from the read head unit 8 and the write head unit 9 to the surface of the recording medium. The heater 82 is energized to generate heat for causing part of the medium facing surface 2 to protrude. The expansion layer 84 expands with the heat generated by the heater 82 and thereby makes part of the medium facing surface 2 protrude.

The expansion layer 84 is made of a material that has a thermal conductivity and a coefficient of linear thermal expansion higher than those of the nonmagnetic part 86. The expansion layer 84 may be made of a metal material. The metal material to form the expansion layer 84 may be either a nonmagnetic metal material or a magnetic metal material. Examples of nonmagnetic metal materials that can be used to form the expansion layer 84 are Al, Cu, and Au. Examples of magnetic metal materials that can be used to form the expansion layer 84 are CoFeN, CoNiFe, NiFe, and CoFe.

The components of the magnetic head expand with the heat generated by the heater 82. In particular, the expansion layer 84 is made of a material that has a thermal conductivity higher than that of the surrounding nonmagnetic part 86. The heat generated by the heater 82 is therefore distributed within the expansion layer 84 more rapidly and uniformly than in the nonmagnetic part 86. Furthermore, the material of the expansion layer 84 has a coefficient of linear thermal expansion higher than that of the nonmagnetic part 86. With the heat generated by the heater 82, the expansion layer 84 therefore expands more rapidly and greatly than the nonmagnetic part 86 does, thereby making part of the medium facing surface 2 protrude. This reduces the distance from the read head unit 8 and the write head unit 9 to the surface of the recording medium.

The sensor 85 is intended to detect contact of part of the medium facing surface 2 with the recording medium. The sensor 85 is a resistor that varies in resistance with a change in its own temperature when part of the medium facing surface 2 makes contact with the recording medium. The sensor 85 is made of a metal material or a semiconductor material that varies in resistance at a considerable rate with respect to a change in temperature, i.e., that has a considerable temperature coefficient of resistance. Specific examples of the material of the sensor 85 include NiFe, W, Cu, Ni, and Pt.

When part of the medium facing surface 2 comes into contact with the recording medium, the frictional heat resulting from the contact raises the temperature of the medium facing surface 2 at and in the vicinity of the part in contact with the recording medium. Such a rise in temperature also raises the temperature of the sensor 85 itself. As a result, the sensor 85 varies in resistance. It is therefore possible to detect the contact of part of the medium facing surface 2 with the recording medium by measuring the resistance of the sensor 85 through two leads (not shown) connected to the sensor 85.

The main pole 15, the side shields 16B and 16C, the gap film 17A, and the nonmagnetic layer 17B will now be described in more detail with reference to FIG. 1 to FIG. 4. As previously described, the main pole 15 has the bottom end 15L, the top surface 15T, and the first and second side parts SP1 and SP2.

As shown in FIG. 2, the bottom end 15L includes a first portion 15L1 and a second portion 15L2. The first portion 15L1 has a first edge located in the medium facing surface 2 and a second edge opposite to the first edge. The second portion 15L2 is located farther from the medium facing surface 2 than is the first portion 15L1 and connected to the first portion 15L1 at the second edge. The distance from the top surface 1a of the substrate 1 to an arbitrary point on at least part of the first portion 15L1 increases with decreasing distance from the arbitrary point to the medium facing surface 2. The second portion 15L2 extends in a direction substantially perpendicular to the medium facing surface 2. At least part of the first portion 15L1 forms an angle in the range of, for example, 12° to 45°, with respect to the direction perpendicular to the medium facing surface 2. The first portion 15L1 may include two portions that form respective different angles with respect to the direction perpendicular to the medium facing surface 2.

The top surface 15T includes a first portion 15T1 and a second portion 15T2. The first portion 15T1 has a first edge located in the medium facing surface 2 and a second edge opposite to the first edge. The second portion 15T2 is located farther from the medium facing surface 2 than is the first portion 15T1 and connected to the first portion 15T1 at the second edge. The distance from the top surface 1a of the substrate 1 to an arbitrary point on the first portion 15T1 decreases with decreasing distance from the arbitrary point to the medium facing surface 2. The second portion 15T2 extends in a direction substantially perpendicular to the medium facing surface 2. The first portion 15T1 forms an angle in the range of, for example, 12° to 45°, with respect to the direction perpendicular to the medium facing surface 2. The first portion 15T1 may include two portions that form respective different angles with respect to the direction perpendicular to the medium facing surface 2.

The first side part SP1 includes a first side surface S1, a third side surface S3, and a fifth side surface S5. The second side part SP2 includes a second side surface S2, a fourth side surface S4, and a sixth side surface S6. The first and second side surfaces S1 and S2 are located in a first region R1 that extends from the medium facing surface 2 to a position at a predetermined distance from the medium facing surface 2. The third and fourth side surfaces S3 and S4 are located in a second region R2 other than the first region R1. The fifth side surface S5 is located in the boundary between the first region R1 and the second region R2 and connects the first side surface S1 to the third side surface S3. The sixth side surface S6 is located in the boundary between the first region R1 and the second region R2 and connects the second side surface S2 to the fourth side surface S4. In FIG. 2 and FIG. 4, the boundary between the first region R1 and the second region R2 is shown by the chain double-dashed lines. The distance D1 (see FIG. 4) from the medium facing surface 2 to the boundary between the region R1 and the region R2 preferably falls within the range of 80 to 620 nm, and more preferably within the range of 120 to 230 nm.

The distance between the first side surface S1 and the second side surface S2 in the track width direction TW decreases with increasing proximity to the top surface 1a of the substrate 1. Consequently, the end face of the main pole 15 located in the medium facing surface 2 decreases in width in the track width direction TW with increasing proximity to the top surface 1a of the substrate 1. The first side surface S1 forms an angle θS1 with respect to the direction perpendicular to the top surface 1a of the substrate 1, and the second side surface S2 forms an angle θS2 with respect to the direction perpendicular to the top surface 1a of the substrate 1. Both of the angles θS1 and θS2 are in the range of, for example, 7° to 17°, and preferably fall within the range of 10° to 15°. Angles that are formed by the third and fourth side surfaces S3 and S4 with respect to the direction perpendicular to the top surface 1a of the substrate 1 are smaller than the angles θS1 and θS2.

Here, for the case where the distance between the side surfaces S3 and S4 in the track width direction TW decreases with increasing proximity to the top surface 1a of the substrate 1, the angles that the side surfaces S3 and S4 form with respect to the direction perpendicular to the top surface of the substrate 1 will be expressed in positive values. For the case where the distance between the side surfaces S3 and S4 in the track width direction TW increases with increasing proximity to the top surface 1a of the substrate 1, the angles that the side surfaces S3 and S4 form with respect to the direction perpendicular to the top surface of the substrate 1 will be expressed in negative values. The angles that the side surfaces S3 and S4 form with respect to the direction perpendicular to the top surface 1a of the substrate 1 are in the range of, for example, −7° to 7°, and preferably fall within the range of −7° to 0°. In the example shown in FIG. 7, the side surfaces S3 and S4 both form an angle of 0° with respect to the direction perpendicular to the top surface 1a of the substrate 1.

In the boundary between the first region R1 and the second region R2, the distance between the side surfaces S3 and S4 in the track width direction TW as seen at the position closest to the bottom end 15L of the main pole 15 is greater than the distance between the side surfaces S1 and S2 in the track width direction TW as seen at the position closest to the bottom end 15L. Each of the fifth side surface S5 and the sixth side surface S6 has a width that increases with increasing proximity to the bottom end 15L.

The main pole 15 includes a portion where the distance between the first side part SP1 and the second side part SP2 in the track width direction TW increases with increasing distance from the medium facing surface 2. In the example shown in FIG. 4, in at least part of the first region R1 the distance between the first side surface S1 and the second side surface S2 in the track width direction TW increases with increasing distance from the medium facing surface 2. In the second region R2, the distance between the third side surface S3 and the fourth side surface S4 in the track width direction TW increases with increasing distance from the medium facing surface 2.

As shown in FIG. 4, the side shield 16B has the first sidewall SW1, and the side shield 16C has the second sidewall SW2. The gap film 17A is disposed to be in contact with the first and second sidewalls SW1 and SW2. The gap film 17A preferably has a thickness in the range of 30 to 120 nm, more preferably in the range of 50 to 80 nm.

The nonmagnetic layer 17B is located away from the medium facing surface 2 and interposed between the gap film 17A and each of the first and second side parts SP1 and SP2. The nonmagnetic layer 17B is not present between the first side surface S1 and the first sidewall SW1 or between the second side surface S2 and the second sidewall SW2, but is present between the third side surface S3 and the first sidewall SW1 and between the fourth side surface S4 and the second sidewall SW2. The distance between the third side surface S3 and the first sidewall SW1 in the track width direction TW is greater than the distance between the first side surface S1 and the first sidewall SW1 in the track width direction TW. The distance between the fourth side surface S4 and the second sidewall SW2 in the track width direction TW is greater than the distance between the second side surface S2 and the second sidewall SW2 in the track width direction TW.

The first sidewall SW1 has: a first wall face F1 located in the first region R1; a third wall face F3 that is located farther from the medium facing surface 2 than is the first wall face F1; and a fifth wall face F5 that connects the first wall face F1 and the third wall face F3 to each other. The second sidewall SW2 has: a second wall face F2 located in the first region R1; a fourth wall face F4 that is located farther from the medium facing surface 2 than is the second wall face F2; and a sixth wall face F6 that connects the second wall face F2 and the fourth wall face F4 to each other.

In at least part of the first region R1, the distance between the first wall face F1 and the second wall face F2 in the track width direction TW increases with increasing distance from the medium facing surface 2. In at least part of the second region R2, the distance between the third wall face F3 and the fourth wall face F4 in the track width direction TW increases with increasing distance from the medium facing surface 2.

As shown in FIG. 4, in at least part of the first region R1, the first wall face F1 and the second wall face F2 form angles θF1 and θF2, respectively, with respect to the direction perpendicular to the medium facing surface 2, while in at least part of the second region R2, the third wall face F3 and the fourth wall face F4 form angles θF3 and θF4, respectively, with respect to the direction perpendicular to the medium facing surface 2. At positions in the first and second side shields 16B and 16C farthest from the top surface 1a of the substrate 1, the angles θF3 and θF4 are greater than the angles θF1 and θF2. The third side surface S3 forms an angle equal to θF1 with respect to the direction perpendicular to the medium facing surface 2. The fourth side surface S4 forms an angle equal to θF2 with respect to the direction perpendicular to the medium facing surface 2.

At the positions in the first and second side shields 16B and 16C farthest from the top surface 1a of the substrate 1, angles that are formed by the fifth and sixth wall faces F5 and F6 with respect to the direction perpendicular to the medium facing surface 2 are greater than the angles θF3 and θF4. In the example shown in FIG. 4, at the positions in the first and second side shields 16B and 16C farthest from the top surface 1a of the substrate 1, the fifth and sixth wall faces F5 and F6 both form an angle of 90° with respect to the direction perpendicular to the medium facing surface 2.

At the positions in the first and second side shields 16B and 16C farthest from the top surface 1a of the substrate 1, the minimum distance D2 (see FIG. 4) from the medium facing surface 2 to the fifth and sixth wall faces F5 and F6 preferably falls within the range of 50 to 500 nm, and more preferably within the range of 70 to 150 nm. As shown in FIG. 3, the first sidewall SW1 further has a seventh wall face F7 that is located farther from the medium facing surface 2 than is the third wall face F3, and a ninth wall face F9 that connects the third wall face F3 and the seventh wall face F7 to each other. The second sidewall SW2 further has an eighth wall face F8 that is located farther from the medium facing surface 2 than is the fourth wall face F4, and a tenth wall face F10 that connects the fourth wall face F4 and the eighth wall face F8 to each other.

The distance between the seventh wall face F7 and the first side part SP1 in the track width direction TW is greater than the distance between the third wall face F3 and the first side part SP1 in the track width direction TW. The distance between the eighth wall face F8 and the second side part SP2 in the track width direction TW is greater than the distance between the fourth wall face F4 and the second side part SP2 in the track width direction TW.

At the positions in the first and second side shields 16B and 16C farthest from the top surface 1a of the substrate 1, the seventh and eighth wall faces F7 and F8 form angles equal to θF3 and θF4, respectively, with respect to the direction perpendicular to the medium facing surface 2, and the ninth and tenth wall faces F9 and F10 both form an angle of 90°, for example, with respect to the direction perpendicular to the medium facing surface 2.

The function and effects of the magnetic head according to the embodiment will now be described. The magnetic head writes data on the recording medium by using the write head unit 9 and reads data written on the recording medium by using the read head unit 8. In the write head unit 9, the coil including the first portion 10 and the second portion 20 produces magnetic fields corresponding to data to be written on the recording medium. A magnetic flux corresponding to the magnetic field produced by the first portion 10 passes through the first return path section 30 and the main pole 15. A magnetic flux corresponding to the magnetic field produced by the second portion 20 passes through the second return path section 40 and the main pole 15. The first portion 10 and the second portion 20 are connected in series or in parallel so that the magnetic flux corresponding to the magnetic field produced by the first portion 10 and the magnetic flux corresponding to the magnetic field produced by the second portion 20 flow in the same direction through the main pole 15.

The main pole 15 allows the magnetic flux corresponding to the magnetic field produced by the first portion 10 and the magnetic flux corresponding to the magnetic field produced by the second portion 20 to pass, and produces a write magnetic field for writing data on the recording medium by means of the perpendicular magnetic recording system.

The write shield 16 captures a disturbance magnetic field applied to the magnetic head from the outside thereof. This makes it possible to prevent erroneous writing on the recording medium induced by the disturbance magnetic field intensively captured into the main pole 15. The write shield 16 also functions to capture a magnetic flux that is produced from the end face of the main pole 15 and spreads in directions other than the direction perpendicular to the plane of the recording medium, and to thereby prevent the magnetic flux from reaching the recording medium.

Furthermore, the write shield 16 and the first and second return path sections 30 and 40 function to allow a magnetic flux that has been produced from the end face of the main pole 15 and has magnetized the recording medium to flow back. More specifically, a part of the magnetic flux that has been produced from the end face of the main pole 15 and has magnetized the recording medium flows back to the main pole 15 through the write shield 16 and the first return path section 30. Another part of the magnetic flux that has been produced from the end face of the main pole 15 and has magnetized the recording medium flows back to the main pole 15 through the write shield 16 and the second return path section 40.

The write shield 16 includes the bottom shield 16A, the two side shields 16B and 16C, and the top shield 16D. This embodiment thus makes it possible that, in regions both backward and forward of the end face of the main pole 15 along the direction T of travel of the recording medium and regions on opposite sides of the end face of the main pole 15 in the track width direction TW, a magnetic flux that is produced from the end face of the main pole 15 and spreads in directions other than the direction perpendicular to the plane of the recording medium can be captured and thereby prevented from reaching the recording medium. Consequently, according to the embodiment, it is possible to prevent the skew-induced adjacent track erase. The bottom shield 16A and the top shield 16D contribute not only to the prevention of the skew-induced adjacent track erase but also to an increase in the gradient of the write magnetic field. The side shields 16B and 16C greatly contribute to the prevention of adjacent track erase, in particular. According to the embodiment, such functions of the write shield 16 serve to increase the recording density.

The embodiment is configured so that in the main pole 15, the distance between the first side surface S1 and the second side surface S2 in the track width direction TW decreases with increasing proximity to the top surface 1a of the substrate 1. Consequently, the end face of the main pole 15 located in the medium facing surface 2 decreases in width in the track width direction TW with increasing proximity to the top surface 1a of the substrate 1. According to the embodiment, this feature also serves to prevent the skew-induced adjacent track erase.

The embodiment is also configured so that in the medium facing surface 2, the distance between the wall faces F1 and F2 of the side shields 16B and 16C in the track width direction TW decreases with increasing proximity to the top surface 1a of the substrate 1, as does the distance between the side surfaces S1 and S2 of the main pole 15. The embodiment thus allows the distance between the side surface S1 and the wall face F1 and the distance between the side surface S2 and the wall face F2 to be small and constant in the medium facing surface 2. This configuration makes it possible for the side shields 16B and 16C to efficiently capture the magnetic flux that is produced from the end face of the main pole 15 and spreads out to opposite areas in the track width direction TW. Consequently, according to the embodiment, it is possible to enhance the function of the side shields 16B and 16C in particular, and to thereby prevent the skew-induced adjacent track erase more effectively.

In the embodiment, the bottom end 15L of the main pole 15 includes the first and second portions 15L1 and 15L2. The top surface 15T of the main pole 15 includes the first and second portions 15T1 and 15T2. The distance from the top surface 1a of the substrate 1 to an arbitrary point on at least part of the first portion 15L1 increases with decreasing distance from the arbitrary point to the medium facing surface 2, while the distance from the top surface 1a of the substrate 1 to an arbitrary point on the first portion 15T1 decreases with decreasing distance from the arbitrary point to the medium facing surface 2. This makes it possible to prevent the skew-induced adjacent track erase and allows the main pole 15 to guide a large amount of magnetic flux to the medium facing surface 2, thereby allowing the improvement of write characteristics (overwrite property).

In the embodiment, the angles that the third and fourth side surfaces S3 and S4 of the main pole 15 form with respect to the direction perpendicular to the top surface 1a of the substrate 1 are smaller than the angles θS1 and θS2 that the first and second side surfaces S1 and S2 of the main pole 15 form with respect to the direction perpendicular to the top surface 1a of the substrate 1. This allows the cross-sectional area of the main pole 15 perpendicular to the direction of flow of the magnetic flux to be larger in the second region R2 as compared with a case where the side surfaces S3 and S4 form angles equal to θS1 and θS2 with respect to the direction perpendicular to the top surface 1a of the substrate 1. The embodiment thus allows a larger amount of magnetic flux to pass through the main pole 15, and consequently allows the improvement of write characteristics such as overwrite property.

If the sidewalls SW1 and SW2 of the side shields 16B and 16C are opposed to the side parts SP1 and SP2 of the main pole 15 at a small distance therefrom over a wide area except the medium facing surface 2, flux leakage from the main pole 15 to the side shields 16B and 16C will increase to cause degradation of write characteristics such as overwrite property. To avoid this, the side shields 16B and 16C might be reduced in dimension in the direction perpendicular to the medium facing surface 2. Such a reduction in dimension, however, makes the side shields 16B and 16C smaller in volume and impairs the original function of the side shields 16B and 16C.

In contrast, the embodiment is configured so that the nonmagnetic layer 17B, a portion of the gap part 17, is not present between the first side surface S1 and the first sidewall SW1 or between the second side surface S2 and the second sidewall SW2, but is present between the third side surface S3 and the first sidewall SW1 and between the fourth side surface S4 and the second sidewall SW2. In addition, the distance between the third side surface S3 and the first sidewall SW1 in the track width direction TW is greater than the distance between the first side surface S1 and the first sidewall SW1 in the track width direction TW. Likewise, the distance between the fourth side surface S4 and the second sidewall SW2 in the track width direction TW is greater than the distance between the second side surface S2 and the second sidewall SW2 in the track width direction TW. According to the embodiment, it is thereby possible to reduce the area where the sidewalls SW1 and SW2 of the side shields 16B and 16C are opposed to the side parts SP1 and SP2 of the main pole 15 at a small distance equivalent to the thickness of the gap film 17A, without making the side shields 16B and 16C smaller in volume. As a result, it is possible to suppress the flux leakage from the main pole 15 to the side shields 16B and 16C without impairing the function of the side shields 16B and 16C.

In the embodiment, as mentioned previously, the angles θF3 and θF4 shown in FIG. 4 are greater than the angles θF1 and θF2. Consequently, the distance between the third side surface S3 and the third wall face F3 in the track width direction TW and the distance between the fourth side surface S4 and the fourth wall face F4 in the track width direction TW both increase with increasing distance from the medium facing surface 2. This allows the flux leakage from the main pole 15 to the side shields 16B and 16C to be suppressed with higher reliability.

In consequence, according to the embodiment, it is possible to achieve both the prevention of adjacent track erase and the improvement of write characteristics.

A method of manufacturing the magnetic head according to the embodiment will now be described. In the method of manufacturing the magnetic head according to the embodiment, first, as shown in FIG. 8 and FIG. 9, the insulating layer 81, the heater 82, the insulating layer 83, the first read shield layer 3, and the first read shield gap film 4 are formed in this order on the substrate 1. Next, the MR element 5 and not-shown two leads connected to the MR element 5 are formed on the first read shield gap film 4. The second read shield gap film 6 is then formed to cover the MR element 5 and the leads. Next, the second read shield layer 7 is formed on the second read shield gap film 6. The nonmagnetic layer 87, the expansion layer 84, the nonmagnetic layer 88, the sensor 85, and the nonmagnetic layer 89 are then formed in this order on the second read shield layer 7.

Next, the yoke layer 31 is formed on the nonmagnetic layer 89 by frame plating, for example. Next, the insulating layer 51 is formed over the entire top surface of the stack. The insulating layer 51 is then polished by, for example, chemical mechanical polishing (hereinafter referred to as CMP), until the yoke layer 31 is exposed. The top surfaces of the yoke layer 31 and the insulating layer 51 are thereby made even with each other.

Next, the magnetic layers 33 and 36 are formed on the yoke layer 31 by frame plating, for example. The insulating film 52 is then formed along the top surface of the yoke layer 31 and the wall faces of the magnetic layers 33 and 36 in an area where the first portion 10 of the coil is to be disposed later. Next, the first portion 10 is formed on the insulating film 52 by frame plating, for example. The insulating layer 53 is then formed in the space between every adjacent turns of the first portion 10. Next, the insulating layer 54 is formed over the entire top surface of the stack. The insulating layer 54 is then polished by, for example, CMP, until the first portion 10 and the magnetic layers 33 and 36 are exposed. The top surfaces of the first portion 10, the magnetic layers 33 and 36, the insulating film 52 and the insulating layers 53 and 54 are thereby made even with each other.

Next, the magnetic layer 34 is formed over the magnetic layer 33 and the insulating layer 54, and the magnetic layer 37 is formed on the magnetic layer 36 by, for example, frame plating. Next, the insulating layer 55 is formed over the entire top surface of the stack. The insulating layer 55 is then polished by, for example, CMP, until the magnetic layers 34 and 37 are exposed. The top surfaces of the magnetic layers 34 and 37 and the insulating layer 55 are thereby made even with each other.

Reference is now made to FIG. 10A to FIG. 15A, FIG. 10B to FIG. 15B, FIG. 10C to FIG. 15C, and FIG. 16A and FIG. 16B to describe a series of steps, subsequent to the aforementioned step, down to the step of determining the shape of the top surface 15T of the main pole 15. These drawings each show a stack of layers formed in the process of manufacturing the magnetic head. FIG. 10A to FIG. 15A each show the top surface of part of the stack. FIG. 10B to FIG. 15B each show a cross section of the stack taken at the position where the medium facing surface 2 is to be formed. FIG. 10C to FIG. 15C each show a cross section parallel to the position where the medium facing surface 2 is to be formed. In FIG. 10A to FIG. 15A, lines nC-nC (n is any integer between 10 and 15 inclusive) indicate the positions of the cross sections shown in FIG. 10C to FIG. 15C. FIG. 16A shows a cross section of the stack taken at the position where the medium facing surface 2 is to be formed. FIG. 16B shows a cross section of the stack perpendicular to the medium facing surface 2 and the top surface 1a of the substrate 1. The parts that are closer to the substrate 1 than is the bottom shield 16A are not shown in FIG. 10A to FIG. 16B. The symbol "ABS" in FIG. 10A to FIG. 15A and FIG. 16B indicates the position where the medium facing surface 2 is to be formed.

Figure 10A:
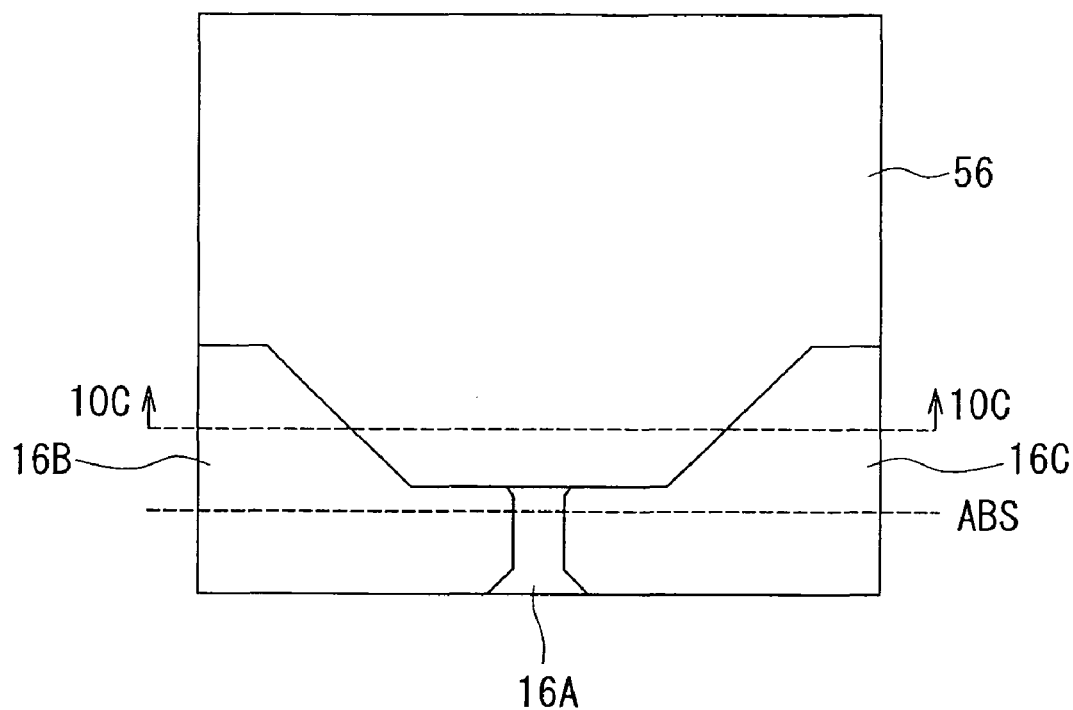
FIG. 10A to FIG. 10C are explanatory diagrams showing a step of a method of manufacturing the magnetic head according to the embodiment of the invention.
Figure 10B:
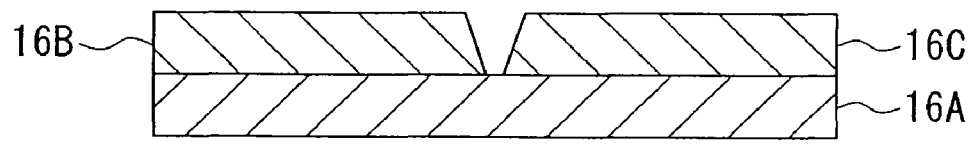
Figure 10C:

FIG. 10A to FIG. 10C show a step that follows the step of evening the top surfaces of the magnetic layers 34 and 37 and the insulating layer 55. In this step, first, the bottom shield 16A is formed on the magnetic layer 34 and the magnetic layer 38 is formed on the magnetic layer 37 by frame plating, for example. Next, the insulating layer 56 is formed over the entire top surface of the stack. The insulating layer 56 is then polished by, for example, CMP, until the bottom shield 16A and the magnetic layer 38 are exposed. The top surfaces of the bottom shield 16A, the magnetic layer 38 and the insulating layer 56 are thereby made even with each other.

Next, the side shields 16B and 16C are formed on the bottom shield 16A. Here, a method of forming the side shields 16B and 16C will be described by way of example. In the method, first, a photoresist layer made of a positive photoresist is patterned by photolithography to form a first resist layer on regions of the top surface of the bottom shield 16A where the side shields 16B and 16C are to be formed later. The first resist layer has two portions that have a shape corresponding to the shape of the side shields 16B and 16C to be formed later. Next, a separating film made of a nonmagnetic material is formed to cover the first resist layer. The separating film is provided to prevent the first resist layer of a positive photoresist from being mixed with a photoresist layer of a negative photoresist to be formed later. Examples of materials suitable for the separating film include alumina and a synthetic resin.

Next, a second resist layer is formed on the separating film by patterning a photoresist layer of a negative photoresist by photolithography. The second resist layer is to later become a mold. The second resist layer has two openings that have a shape corresponding to the shape of the side shields 16B and 16C to be formed later. Next, by performing wet etching, for example, the separating film is removed in the portion thereof not covered by the second resist layer. The first and second resist layers are then exposed to light. Thereafter, the first resist layer is removed from the two openings of the second resist layer by using an alkaline developer, for example. When the first resist layer is removed or after the first resist layer has been removed, the separating film is removed in the portion thereof extending along the wall faces of the two openings of the second resist layer. As a result of this step, the second resist layer becomes the mold which is formed in a region excluding the regions where the side shields 16B and 16C are to be formed later. Next, the side shields 16B and 16C are formed on the top surface of the bottom shield 16A by performing plating without forming any seed layer. The side shields 16B and 16C are respectively formed in the two openings of the mold. The mold and the separating film are then removed. FIG. 10A to FIG. 10C show the side shields 16B and 16C thus formed.

Figure 11A:
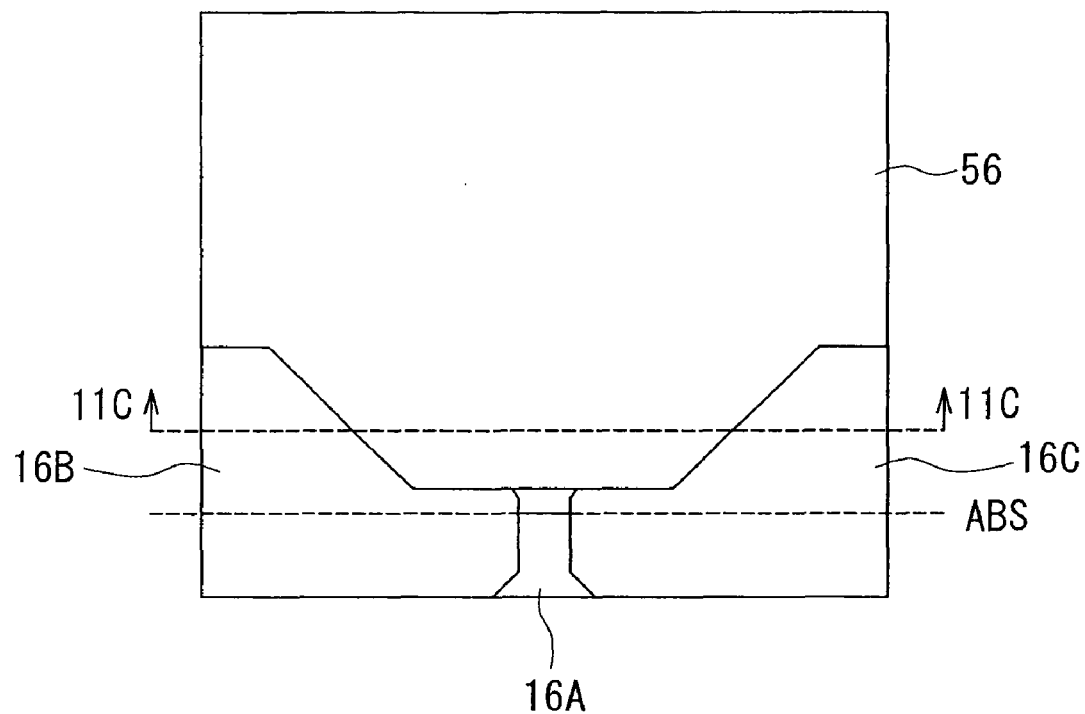
FIG. 11A to FIG. 11C are explanatory diagrams showing a step that follows the step shown in FIG. 10A to FIG. 10C.
Figure 11B:
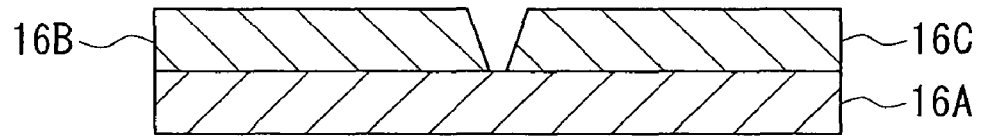
Figure 11C:

FIG. 11A to FIG. 11C show the next step. In this step, first, a not-shown etching mask is formed over the bottom shield 16A and the side shields 16B and 16C. This etching mask is formed by patterning a photoresist layer. Next, the insulating layer 56 is etched by using the etching mask. The etching proceeds until the etched bottom reaches a level between the top and bottom surfaces of the insulating layer 56 when unetched. For example, reactive ion etching is employed for this etching. Next, the etching mask is removed. The top surface of the bottom shield 16A is then etched by, for example, ion beam etching, in the portion thereof in the vicinity of the position ABS where the medium facing surface 2 is to be formed. This makes the top surface of the bottom shield 16A inclined as shown in FIG. 8. FIG. 11A to FIG. 11C show the bottom shield 16A and the side shields 16B and 16C after this etching. This etching determines the shape of the sidewalls SW1 and SW2 of the side shields 16B and 16C.

Figure 12A:
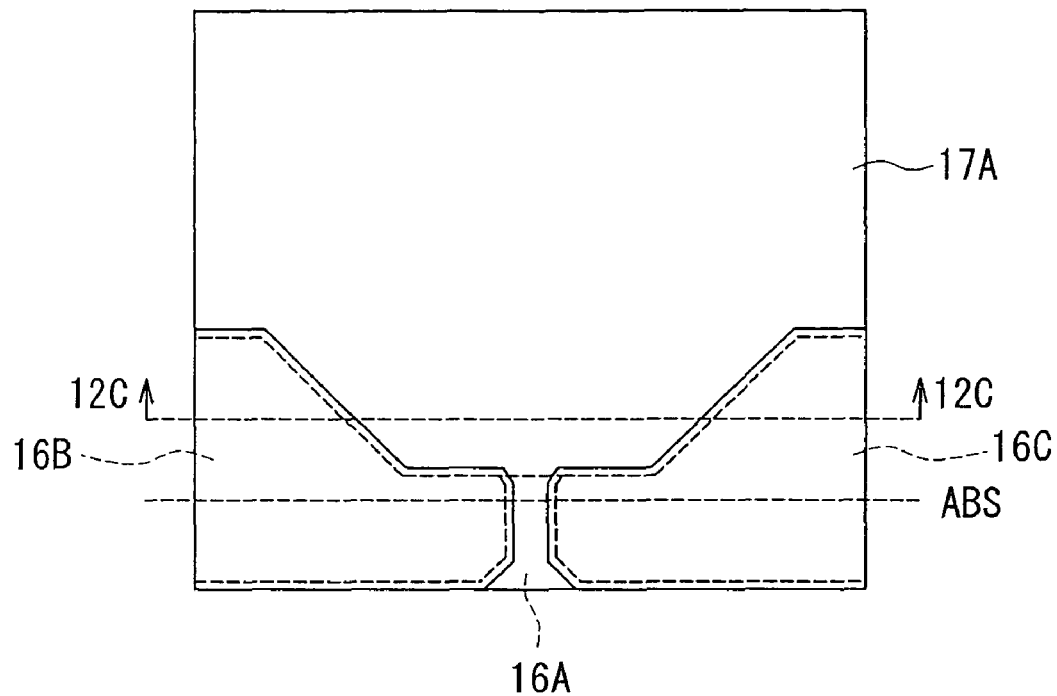
FIG. 12A to FIG. 12C are explanatory diagrams showing a step that follows the step shown in FIG. 11A to FIG. 11C.
Figure 12B:
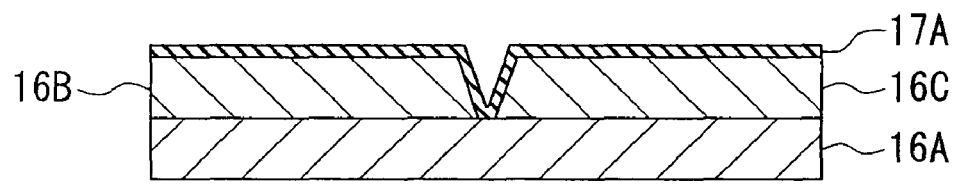
Figure 12C:
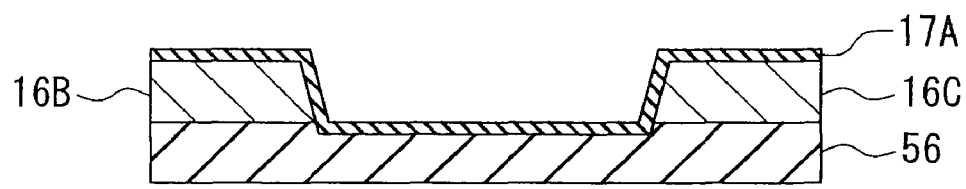

FIG. 12A to FIG. 12C show the next step. In this step, the gap film 17A is formed to cover the bottom shield 16A and the side shields 16B and 16C. If alumina is selected as the material of the gap film 17A, the gap film 17A is formed by atomic layer deposition, for example. If Ru is selected as the material of the gap film 17A, the gap film 17A is formed by chemical vapor deposition, for example.

Figure 13A:
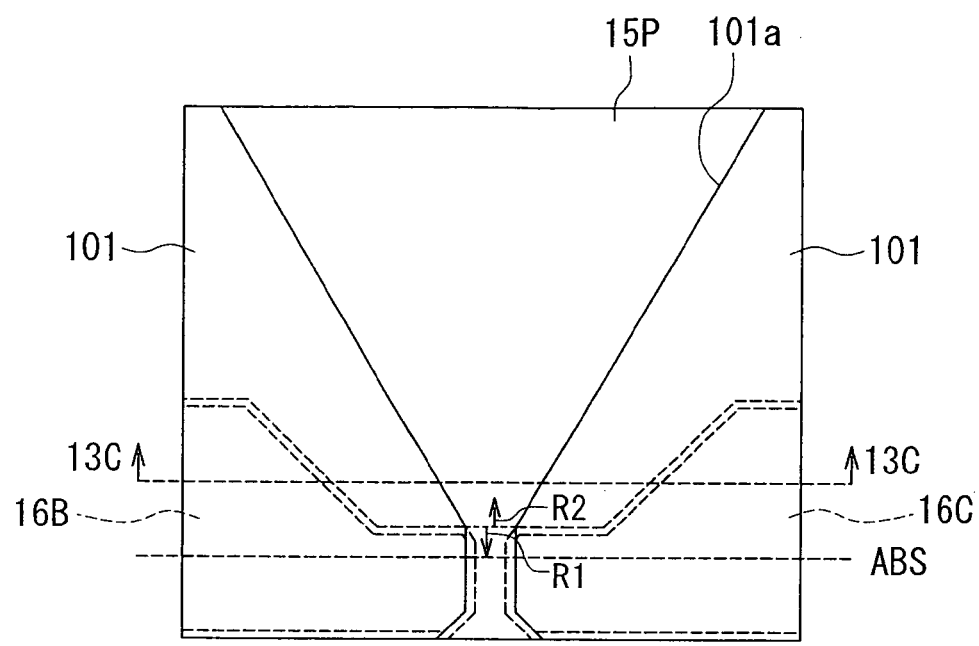
FIG. 13A to FIG. 13C are explanatory diagrams showing a step that follows the step shown in FIG. 12A to FIG. 12C.
Figure 13B:
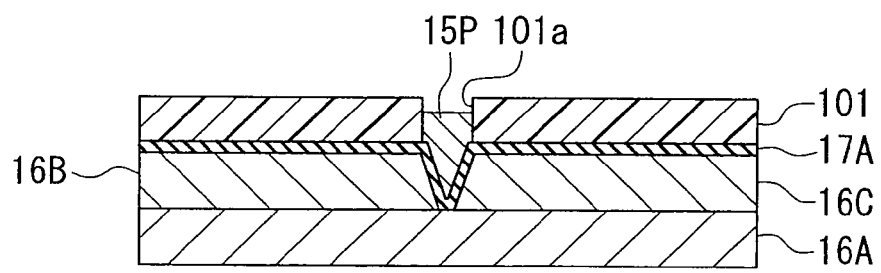
Figure 13C:
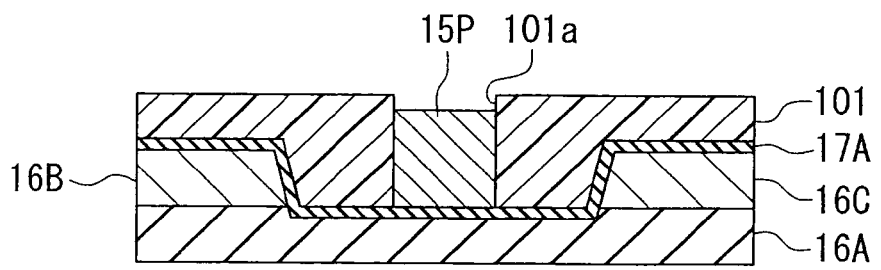

FIG. 13A to FIG. 13C show the next step. In this step, first, an opening for exposing the top surface of the magnetic layer 38 is formed in the gap film 17A. Next, a mold 101 having an opening 101a is formed on the gap film 17A. The mold 101 is formed by patterning a photoresist layer.

Using the mold 101, a preliminary main pole 15P is then formed in the opening 101a of the mold 101 by plating, for example. The preliminary main pole 15P is to become the main pole 15 later. The preliminary main pole 15P is formed such that its top surface is located at a level higher than the top surfaces of the side shields 16B and 16C.

In the first region R1, as shown in FIG. 13A and FIG. 13B, the width of the opening 101a in the track width direction (the lateral direction) is greater than the maximum distance in the track width direction between the first and second side surfaces S1 and S2 of the main pole 15 to be formed later. In the first region R1, the preliminary main pole 15P is thus formed such that the gap film 17A is interposed between the preliminary main pole 15P and each of the sidewalls SW1 and SW2 of the side shields 16B and 16B. Consequently, the shape of the first and second side surfaces S1 and S2 of the main pole 15 is determined by the sidewalls SW1 and SW2 of the side shields 16B and 16C and the gap film 17A.

Meanwhile, in the second region R2, as shown in FIG. 13A and FIG. 13C, the sidewalls of the opening 101a are located away from the portions of the gap film 17A that lie on the sidewalls SW1 and SW2 of the side shields 16B and 16C. The positions of the sidewalls of the opening 101a in the second region R2 coincide with the positions of the third and fourth side surfaces S3 and S4 of the main pole 15 to be formed later. In the second region R2, the preliminary main pole 15P is thus formed such that the gap film 17A and the mold 101 are interposed between the preliminary main pole 15P and each of the sidewalls SW1 and SW2 of the side shields 16B and 16B. Consequently, the third to sixth side surfaces S3 to S6 of the main pole 15 are shaped by the mold 101.

Figure 14A:
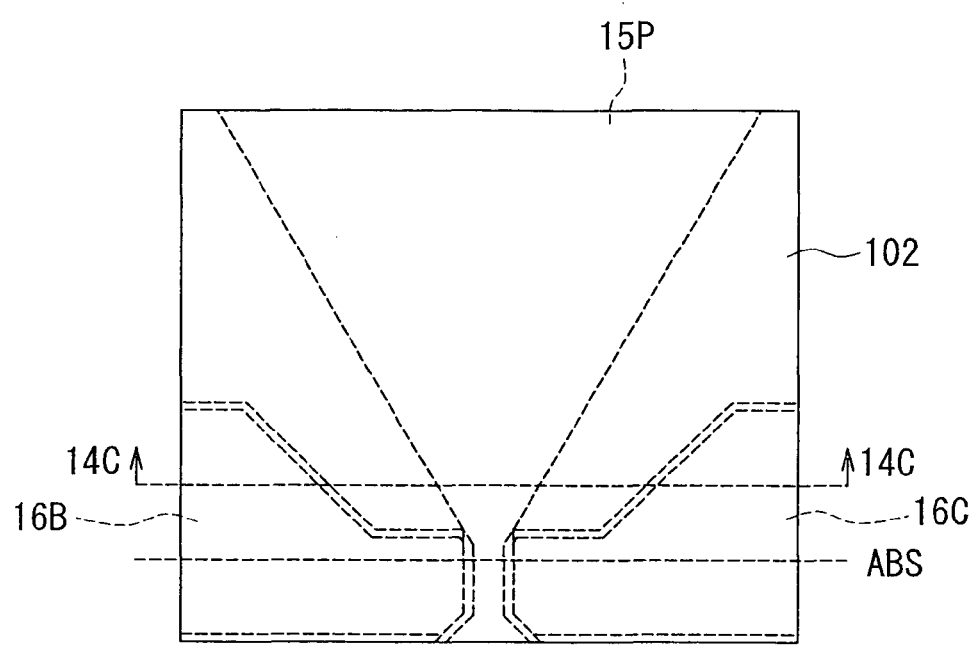
FIG. 14A to FIG. 14C are explanatory diagrams showing a step that follows the step shown in FIG. 13A to FIG. 13C.
Figure 14B:
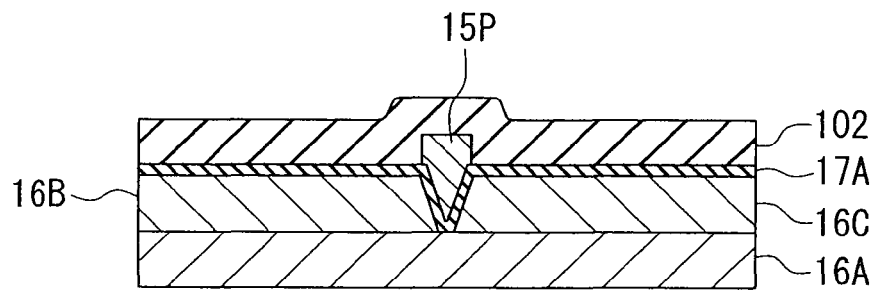
Figure 14C:
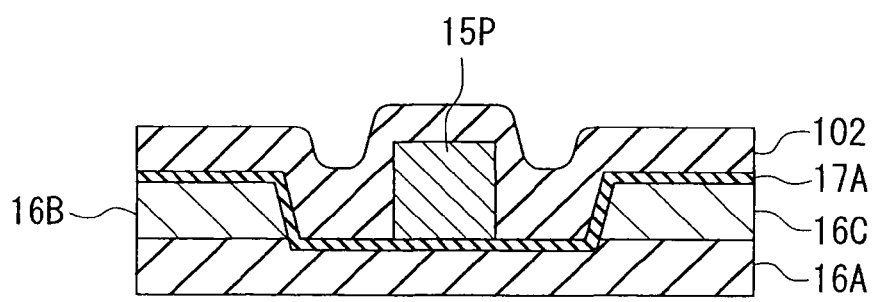

FIG. 14A to FIG. 14C show the next step. In this step, first, the mold 101 is removed. Next, a preliminary nonmagnetic layer 102, which is to later become the nonmagnetic layer 17B, is formed to cover the side shields 16B and 16C, the gap film 17A and the preliminary main pole 15P.

Figure 15A:
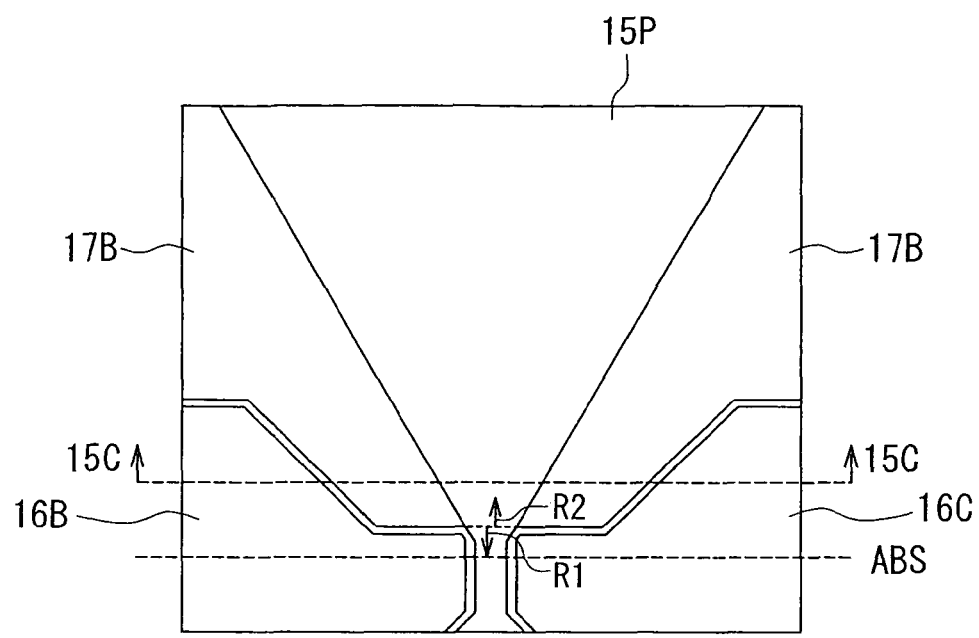
FIG. 15A to FIG. 15C are explanatory diagrams showing a step that follows the step shown in FIG. 14A to FIG. 14C.
Figure 15B:
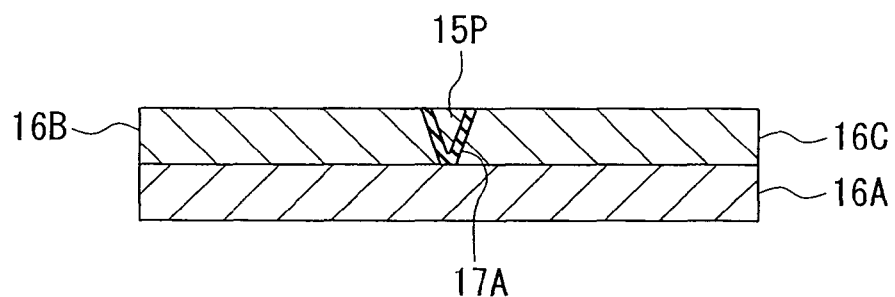
Figure 15C:
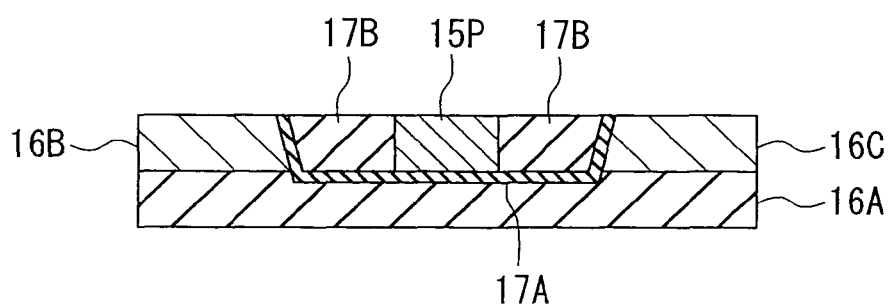
Figure 16A:
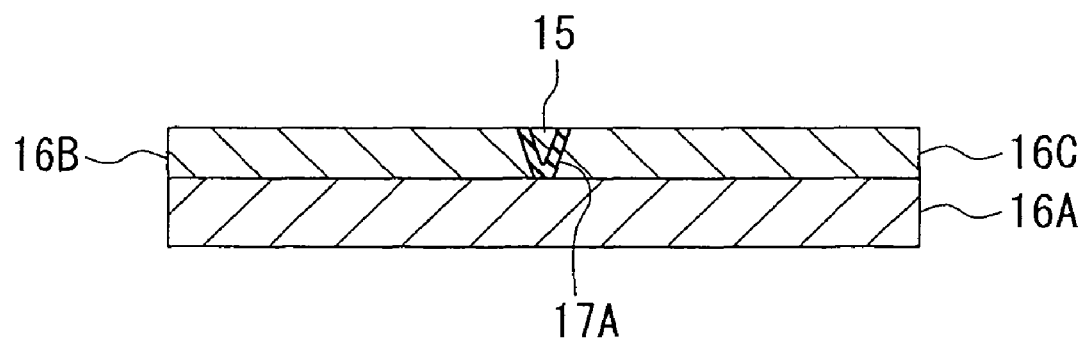
FIG. 16A and FIG. 16B are explanatory diagrams showing a step that follows the step shown in FIG. 15A to FIG. 15C.
Figure 16B:
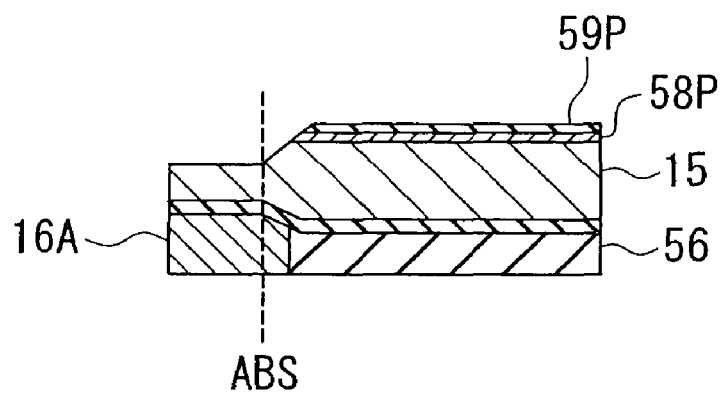

FIG. 15A to FIG. 15C show the next step. In this step, the preliminary nonmagnetic layer 102 is polished by, for example, CMP, until the preliminary main pole 15P and the side shields 16B and 16C are exposed. After this step, in the region R2 the preliminary nonmagnetic layer 102 remains between the preliminary main pole 15P and the portions of the gap film 17A lying on the sidewalls SW1 and SW2 of the side shields 16B and 16C. The remaining preliminary nonmagnetic layer 102 makes the nonmagnetic layer 17B.

FIG. 16A and FIG. 16B show the next step. In this step, first, a first mask layer and a second mask layer, which are to later become the nonmagnetic metal layer 58 and the insulating layer 59, respectively, are formed over the preliminary main pole 15P and the side shields 16B and 16C. Using the first and second mask layers as an etching mask, the preliminary main pole 15P and the side shields 16B and 16C are then partially etched by ion beam etching, for example. As a result, the first mask layer, the second mask layer, and the preliminary main pole 15P become the nonmagnetic metal layer 58, the insulating layer 59, and the main pole 15, respectively. This etching determines the shape of the top surface 15T of the main pole 15.

The step shown in FIG. 13A to FIG. 13C to the step shown in FIG. 16A and FIG. 16B correspond to "the step of forming the main pole and the nonmagnetic layer" according to the invention.

Steps that follow the step of FIG. 16A and FIG. 16B will now be described with reference to FIG. 8 and FIG. 9. First, the gap layer 17C is formed over the entire top surface of the stack by sputtering or chemical vapor deposition, for example. The gap layer 17C, the nonmagnetic metal layer 58 and the insulating layer 59 are then selectively etched by, for example, ion beam etching, so that a portion of the top surface 15T of the main pole 15 and portions of the top surfaces of the side shields 16B and 16C are exposed. Next, the top shield 16D is formed over the side shields 16B and 16C and the gap layer 17C, and the yoke layer 41 is formed on the main pole 15 by, for example, frame plating.

Next, the nonmagnetic layer 61 is formed over the entire top surface of the stack. The nonmagnetic layer 61 is then polished by, for example, CMP, until the top shield 16D and the yoke layer 41 are exposed. The top surfaces of the top shield 16D, the yoke layer 41 and the nonmagnetic layer 61 are thereby made even with each other.

Next, the insulating layer 62 is formed on the top surface of the nonmagnetic layer 61 in an area where the second portion 20 of the coil is to be disposed later. The second portion 20 is then formed on the insulating layer 62 by frame plating, for example. Next, the insulating layer 63 is formed to cover the second portion 20. The magnetic layer 42 is then formed over the top shield 16D, the yoke layer 41 and the insulating layer 63 by frame plating, for example.

Next, the protection layer 70 is formed to cover the entire top surface of the stack. Wiring, terminals and other components are then formed on the protection layer 70, and the substrate 1 is cut near the position ABS. The cut surface is polished to form the medium facing surface 2, and then fabrication of flying rails and other processes are performed to complete the magnetic head.

In the method of manufacturing the magnetic head according to the embodiment, the formation of the side shields 16B and 16C is followed by the step shown in FIG. 13A to FIG. 13C. In the step, the gap film 17A is formed to cover the bottom shield 16A and the side shields 16B and 16C, and the mold 101 having the opening 101a is then formed on the gap film 17A. The mold 101 is then used to form the preliminary main pole 15P which is to become the main pole 15 later. The shape of the first and second side surfaces S1 and S2 of the main pole 15 is determined by the sidewalls SW1 and SW2 of the side shields 16B and 16C and the gap film 17A. Meanwhile, the third to sixth side surfaces S3 to S6 of the main pole 15 are shaped by the mold 101.

In the step shown in FIG. 14A to FIG. 14C and the step shown in FIG. 15A to FIG. 15C, the nonmagnetic layer 17B is formed after the removal of the mold 101. This allows the nonmagnetic layer 17B to be formed only in the second region R2.

According to such a method of manufacturing the magnetic head, it is possible to easily form the main pole 15, the side shields 16B and 16C, the gap film 17A, and the nonmagnetic layer 17B having the shapes and positional relationship that enable both the prevention of adjacent track erase and the improvement of write characteristics.

The present invention is not limited to the foregoing embodiment, and various modifications may be made thereto. For example, in the foregoing embodiment, the bottom end 15L of the main pole 15 includes the first portion 15L1 and the second portion 15L2, and the top surface 15T of the main pole 15 includes the first portion 15T1 and the second portion 15T2. Nevertheless, the main pole 15 may be configured to have a bottom end 15L and a top surface 15T that each entirely extend in a direction substantially perpendicular to the medium facing surface 2.

The foregoing embodiment has been described with reference to a magnetic head having such a structure that the read head unit 8 is formed on the base body and the write head unit 9 is stacked on the read head unit 8; however, the read head unit 8 the write head unit 9 may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A magnetic head for perpendicular magnetic recording, comprising:

a medium facing surface that faces a recording medium;
   a coil that produces a magnetic field corresponding to data to be written on the recording medium;
   a main pole that has an end face located in the medium facing surface, the main pole allowing a magnetic flux corresponding to the magnetic field produced by the coil to pass, and producing a write magnetic field for writing the data on the recording medium by means of a perpendicular magnetic recording system;
   a write shield made of a magnetic material;
   a gap part made of a nonmagnetic material and provided between the main pole and the write shield; and
   a substrate having a top surface, wherein:
   the coil, the main pole, the write shield, and the gap part are located above the top surface of the substrate;
   the write shield includes first and second side shields, and a top shield that is in contact with the first and second side shields;
   the first and second side shields have two end faces that are located in the medium facing surface at positions on opposite sides of the end face of the main pole in a track width direction;
   the top shield has an end face that is located in the medium facing surface at a position forward of the end face of the main pole along a direction of travel of the recording medium;
   the main pole has a first side part and a second side part that are opposed to each other in the track width direction;
   the first side shield has a first sidewall that faces the first side part of the main pole;
   the second side shield has a second sidewall that faces the second side part of the main pole;
   the gap part includes a gap film that is disposed to be in contact with the first and second sidewalls, and a nonmagnetic layer that is located away from the medium facing surface and interposed between the gap film and the first and second side parts;
   the first side part has a first side surface located in a first region and a third side surface located in a second region other than the first region, the first region extending from the medium facing surface to a position at a predetermined distance from the medium facing surface;
   the second side part has a second side surface located in the first region and a fourth side surface located in the second region;
   the nonmagnetic layer is not present between the first side surface and the first sidewall or between the second side surface and the second sidewall, but is present between the third side surface and the first sidewall and between the fourth side surface and the second sidewall;
   a distance between the third side surface and the first sidewall in the track width direction is greater than a distance between the first side surface and the first sidewall in the track width direction;
   a distance between the fourth side surface and the second sidewall in the track width direction is greater than a distance between the second side surface and the second sidewall in the track width direction;
   a distance between the first side surface and the second side surface in the track width direction decreases with increasing proximity to the top surface of the substrate; and
   angles that are formed by the third and fourth side surfaces with respect to a direction perpendicular to the top surface of the substrate are smaller than angles that are formed by the first and second side surfaces with respect to the direction perpendicular to the top surface of the substrate.

2. The magnetic head for perpendicular magnetic recording according to claim 1, wherein a distance from the medium facing surface to a boundary between the first region and the second region falls within a range of 80 to 620 nm.

3. The magnetic head for perpendicular magnetic recording according to claim 1, wherein the write shield further includes a bottom shield that is in contact with the first and second side shields, and the bottom shield has an end face that is located in the medium facing surface at a position backward of the end face of the main pole along the direction of travel of the recording medium.

4. The magnetic head for perpendicular magnetic recording according to claim 1, wherein:

the main pole includes a portion where a distance between the first side part and the second side part in the track width direction increases with increasing distance from the medium facing surface;
   the first sidewall has a first wall face located in the first region, and a third wall face that is located farther from the medium facing surface than is the first wall face;
   the second sidewall has a second wall face located in the first region, and a fourth wall face that is located farther from the medium facing surface than is the second wall face;
   in at least part of the first region, a distance between the first wall face and the second wall face in the track width direction increases with increasing distance from the medium facing surface;
   in at least part of the second region, a distance between the third wall face and the fourth wall face in the track width direction increases with increasing distance from the medium facing surface; and
   at positions in the first and second side shields farthest from the top surface of the substrate, angles that are formed by the third and fourth wall faces with respect to a direction perpendicular to the medium facing surface in the at least part of the second region are greater than angles that are formed by the first and second wall faces with respect to the direction perpendicular to the medium facing surface in the at least part of the first region.

5. The magnetic head for perpendicular magnetic recording according to claim 4, wherein:

the first sidewall further has a fifth wall face that connects the first wall face and the third wall face to each other;
   the second sidewall further has a sixth wall face that connects the second wall face and the fourth wall face to each other; and
   at the positions in the first and second side shields farthest from the top surface of the substrate, angles that are formed by the fifth and sixth wall faces with respect to the direction perpendicular to the medium facing surface are greater than the angles that are formed by the third and fourth wall faces with respect to the direction perpendicular to the medium facing surface in the at least part of the second region.

6. The magnetic head for perpendicular magnetic recording according to claim 5, wherein, at the positions in the first and second side shields farthest from the top surface of the substrate, a minimum distance from the medium facing surface to the fifth and sixth wall faces falls within a range of 50 to 500 nm.

7. A method of manufacturing the magnetic head for perpendicular magnetic recording of claim 1, comprising the steps of:
    forming the first and second side shields;
    forming the gap film after the first and second side shields are formed;
    forming the main pole and the nonmagnetic layer after the gap film is formed;
    forming the top shield after the main pole and the nonmagnetic layer are formed; and
    forming the coil.

8. The method of manufacturing the magnetic head for perpendicular magnetic recording according to claim 7, wherein the step of forming the main pole and the nonmagnetic layer includes the steps of:
    forming a mold on the gap film, the mold having an opening;
    forming a preliminary main pole by using the mold, the preliminary main pole being intended to later become the main pole;
    removing the mold after the preliminary main pole is formed;
    forming a preliminary nonmagnetic layer after the mold is removed, the preliminary nonmagnetic layer being intended to later become the nonmagnetic layer and being formed to cover the first and second side shields, the gap film and the preliminary main pole; and
    polishing the preliminary nonmagnetic layer until the first and second side shields and the preliminary main pole are exposed.

9. The method of manufacturing the magnetic head for perpendicular magnetic recording according to claim 7, wherein the write shield further includes a bottom shield that is in contact with the first and second side shields, and the bottom shield has an end face that is located in the medium facing surface at a position backward of the end face of the main pole along the direction of travel of the recording medium,
    the method further comprising the step of forming the bottom shield before the first and second side shields are formed,
    wherein the first and second side shields are formed on the bottom shield.

* * * * *